US008713155B2

(12) United States Patent
Jin et al.

(10) Patent No.: US 8,713,155 B2
(45) Date of Patent: Apr. 29, 2014

(54) METHOD AND DEVICE FOR MANAGING DEVICES IN DEVICE MANAGEMENT SYSTEM

(71) Applicant: Huawei Device Co., Ltd., Guangdong (CN)

(72) Inventors: Zhihao Jin, Beijing (CN); Rui Wang, Beijing (CN); Xinmiao Chang, Beijing (CN); Haitao Lui, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 33 days.

(21) Appl. No.: 13/660,509

(22) Filed: Oct. 25, 2012

(65) Prior Publication Data
US 2013/0046888 A1 Feb. 21, 2013

Related U.S. Application Data

(63) Continuation of application No. PCT/CN2011/080920, filed on Oct. 18, 2011.

(30) Foreign Application Priority Data

Oct. 26, 2010 (CN) .......................... 2010 1 0527437

(51) Int. Cl.
G06F 15/173 (2006.01)
(52) U.S. Cl.
USPC ........................................................ 709/223
(58) Field of Classification Search
USPC ........................................................ 709/223
See application file for complete search history.

(56) References Cited

U.S. PATENT DOCUMENTS

2004/0038646 A1  2/2004  Bourgart

FOREIGN PATENT DOCUMENTS

| CN | 101311958 A | 11/2008 |
|----|-------------|---------|
| CN | 101453396 A | 6/2009 |
| CN | 101483551 A | 7/2009 |
| CN | 101582798 A | 11/2009 |
| CN | 101783739 A | 7/2010 |
| KR | 20100072978 A | 7/2010 |

OTHER PUBLICATIONS

Extended European Search Report in corresponding European Patent Application No. 11835603.9 (Jan. 24, 2013).
"Group Management in GwMO," Aug. 2010, Open Mobile Alliance, San Diego, California.
"Gateway Management Object (GwMO)," Aug. 2010, Open Mobile Alliance, San Diego, California.

(Continued)

Primary Examiner — Jason Recek
(74) Attorney, Agent, or Firm — Leydig, Voit & Mayer, Ltd.

(57) ABSTRACT

A method for managing devices in a device management system includes: sending, by a server, target device condition information to a gateway; and sending, by the server, management information for a target device to the gateway, and triggering the gateway to determine the target device according to the target device condition information and send the management information to the target device. According to a trigger of the server and the target device condition information sent by the server, the gateway searches for the target device; and according to a trigger of the server, the gateway sends the management information sent by the server to the target device. Embodiments of the present disclosure also provide a server and a gateway in a device management system. Thereby, a type of target devices can be managed in batches.

42 Claims, 17 Drawing Sheets

(56) References Cited

OTHER PUBLICATIONS

"OMA-DM-GwMO-2010-0016R02-INP__GwMO__Data__Flow__Diagram__for__discussion—GwMO Data Flow Diagram for Discussion," Input Contribution, Aug. 27, 2010, Open Mobile Alliance, San Diego, California.

"OMA-DM-GwMO-2010-0024—Options for Command Fan-Out Functionality," Jul. 16, 2010, Open Mobile Alliance, San Diego, California.

"OMA-DM-GwMO-2010-0056-CR__Command__Fanout__Alert—Baseline for the Command Fanout Alert," Change Request, Sep. 28, 2010, Open Mobile Alliance, San Diego, California.

International Search Report in corresponding International Patent Application No. PCT/CN2011/080920 (Jan. 19, 2012).

CONT. FROM FIG. 2A

CONT. FROM FIG. 2A

CONT. FROM FIG. 2A

S209. The gateway initiates a session to all terminals in the local area network in sequence, requesting to obtain the node values of the nodes to be matched and specified by the server, and obtains, through session interactions, the node values of the nodes to be matched that are reported by each terminal, and executes step S210

S210. Compare the node values reported by the successfully matched terminals with the information stored in the RefValue node, and if they are the same, execute step S211, or otherwise, end the session S211. Determine the terminals whose comparison results are the same as target terminals, and store the terminal IDs of the target terminals into the Result node created by the gateway, and then execute step S212

S212. Send the management information stored in the Content node to the target terminal corresponding to each terminal ID stored in the Result node If the management information is a common management command, execute step S213: Store the execution result of the management information fed back by the corresponding target terminal into the ResultDetail node under the Result node

FIG. 2B

METHOD AND DEVICE FOR MANAGING DEVICES IN DEVICE MANAGEMENT SYSTEM

CROSS-REFERENCE TO RELATED APPLICATIONS

This application is a communication of International Patent Application No. PCT/CN2011/080920, filed on Oct. 18, 2011, which claims priority to Chinese Patent Application No. 201010527437.2, filed on Oct. 26, 2010, both of which are hereby incorporated by reference in their entirety.

FIELD OF THE INVENTION

Embodiments of the present disclosure relate to the field of communication technologies and, in particular, to a method and a device for managing devices in a device management system.

BACKGROUND OF THE INVENTION

OMA (Open Mobile Architecture) DM (Device Management) V1.3 (Version 1.3) is a unified specification for device management defined by the OMA DM WG (Work Group). The DM system provides a low-cost solution for a third party to manage and set environmental parameters and configuration information in terminal devices. The third party can be an operator, a service provider, or an information management department of a partner, and so on.

One conventional solution allows a server to manage devices in a local area network (LAN) through a gateway (GW). The server and the gateway both comply with the OMA DM specification. The server may manage the gateway through the DM protocol. The gateway may manage devices through the DM protocol or other device management protocols. The server may indirectly manage devices by managing the gateway.

During the implementation of the present disclosure, the inventor finds that the prior art does not provide a solution for managing a type of devices in batches by a server.

SUMMARY OF THE INVENTION

Embodiments of the present disclosure provide a method and a device for managing devices in a device management system so that devices can be managed in batches.

The objective of the present disclosure is achieved through the following technical solutions.

A method for managing devices in a device management system includes:

sending, by a server, target device condition information and management information for a target device to a gateway; and triggering, by the server, the gateway to determine the target device according to the target device condition information and send the management information to the target device.

A method for managing devices in a device management system includes:

sending, by a server, target device condition information to a gateway;

triggering, by the server, the gateway to determine a target device according to the target device condition information; and sending, by the server, management information for the target device to the gateway, and triggering the gateway to send the management information to the target device.

A method for managing devices in a device management system includes:

determining, by a gateway, a target device according to a trigger of a server and target device condition information sent by the server; and sending, by the gateway, management information to the target device according to a trigger of the server, where the management information is sent to the gateway by the server.

A server in a device management system includes:

a condition information configuring module, adapted to send target device condition information to a gateway;

a management information sending module, adapted to send management information for a target device to the gateway; and a triggering module, adapted to trigger the gateway to determine the target device according to the target device condition information and send the management information to the target device.

A server in a device management system includes:

a condition information configuring module, adapted to send target device condition information to a gateway;

a triggering module, adapted to trigger the gateway to determine a target device according to the target device condition information; and a management information sending module, adapted to send management information for the target device to the gateway, where the triggering module is further adapted to trigger the gateway to send the management information to the target device after the management information sending module completes work.

A gateway device in a device management system includes:

a determining module, adapted to determine a target device according to a trigger of a server and target device condition information sent by the server; and a command sending module, adapted to send management information to the target device according to a trigger of the server, where the management information is sent by the server.

As may be seen from the technical solutions provided by the embodiments of the present disclosure, in the embodiments of the present disclosure, the server sends target device condition information and a management command to the gateway in a management operation, and the gateway determines, according to the target device condition information, one or more target devices meeting the condition and sends the management command to these target devices, thereby managing a type of target devices in batches. Compared with the prior art, the solutions provided by the embodiments of the present disclosure are easy to implement, involve few operations, and may manage multiple specific devices by changing the target device condition information.

BRIEF DESCRIPTION OF THE DRAWINGS

To illustrate the technical solutions in the embodiments of the present disclosure more clearly, the accompanying drawings required for describing the embodiments are introduced below briefly. Apparently, the accompanying drawings in the following descriptions merely show some of the embodiments of the present disclosure, and persons of ordinary skill in the art can obtain other drawings according to the accompanying drawings without creative efforts.

FIG. 2A and FIG. 2B are a signaling flowchart of a method according to a first embodiment of the present disclosure;

DETAILED DESCRIPTION OF THE EMBODIMENTS

The technical solutions of the embodiments of the present disclosure are hereinafter described clearly and completely with reference to the accompanying drawings in the embodiments of the present disclosure. Evidently, the described embodiments are only some example embodiments of the present disclosure, rather than all embodiments of the present disclosure. All other embodiments obtained by persons of ordinary skill in the art based on the embodiments of the present disclosure without creative efforts shall fall within the protection scope of the present disclosure.

In an existing DM system, a server sends a management command to a gateway to manage the device indirectly. In one embodiment, the management command includes information about a single target device. If the server needs to manage devices in batches, multiple management operations are required. This solution has several disadvantages. Namely, the operations of the server are increased and management efficiency is low. In an alternate solution, the server sends a management command to the gateway, and the gateway broadcasts the management command to all devices in a local area network to manage the devices in batches. However, the alternate solution has the following disadvantages: the solution can only be used in management operations applicable to all devices and cannot be used to manage a type of devices. Evidently, the prior art does not provide a solution for batch management operations for managing a type of devices in batches through simple operations.

Figure 1:
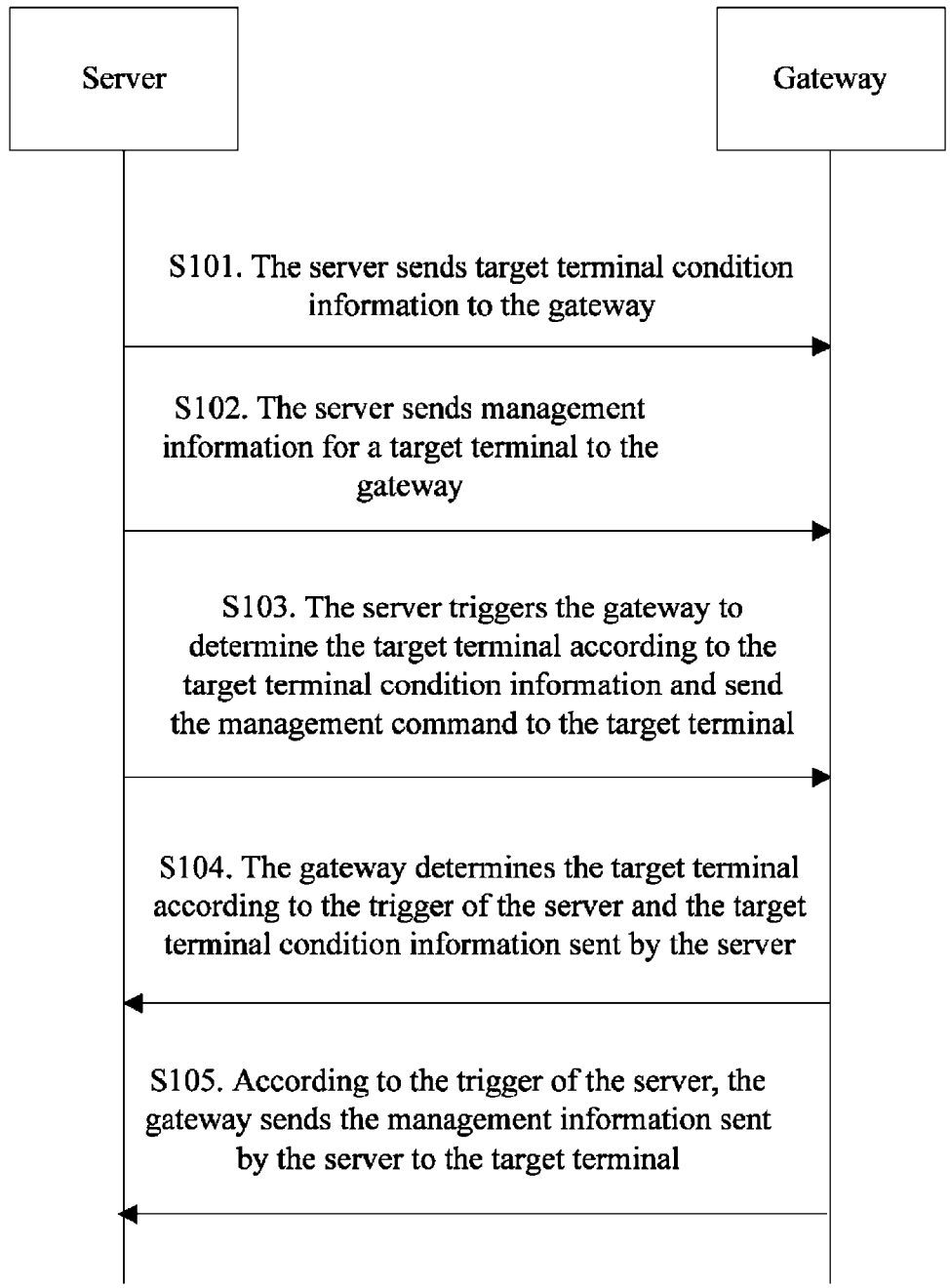
FIG. 1 is a signaling flowchart of a method according to an embodiment of the present disclosure.

In view of the preceding problems, an embodiment of the present disclosure provides a method for managing devices in batches in a DM system. The processing procedure is shown in FIG. 1, and the specific implementation is as follows:

On the server side:

S101. The server sends target device condition information to the gateway, where there may be one or more pieces of target device condition information, which describes the characteristics of one or more types of devices.

S102. The server sends management information for a target device to the target device, where the management information may be a common management command or a sessionless command.

S103. The server triggers the gateway to determine the target device according to the target device condition information and send the management command to the target device.

On the gateway side:

S104. The gateway determines the target device according to the trigger of the server and the target device condition information sent by the server.

S105. According to the trigger of the server, the gateway sends the management information sent by the server to the target device.

If the management information is a sessionless command, the management operation is ended. If the management information is a common management command, the target device feeds back the execution result of the management command to the gateway, and the gateway feeds back the execution result to the server.

In the embodiment of the present disclosure, the server sends target device condition information and a management command to the gateway in a management operation, and the gateway determines, according to the target device condition information, one or more target devices meeting the condition and sends the management command to these target devices, thereby managing a type of target devices in batches. Compared with the prior art, the solution provided by the embodiment of the present disclosure is easy to implement, involves few operations, and may manage multiple specific devices by changing the target device condition information.

In the embodiment of the present disclosure, the server may specifically configure the target device condition information in the management tree of the gateway or send the target device condition information through a message. The target device condition information may specifically be the path of nodes to be matched and the node values of the nodes to be matched, that is, the devices including the nodes to be matched (both the path and the node values are consistent) are determined as the target devices, and the target devices are managed in batches. The target device condition information may also be the path of the nodes to be matched. That is, the devices including the nodes to be matched (the path is consistent) are determined as the target devices, and the target devices are managed in batches.

In one embodiment of the present disclosure, the server may specifically configure a management information node in the management tree of the gateway and store the management information into the management information node in the form of node values. The server may also send the management information to the gateway in the form of a management command. In one embodiment, an executable node may be configured in the management tree of the gateway to trigger the gateway to work. In another embodiment, an execution identifier may be carried in the management information to trigger the gateway to work.

In addition, in some embodiment, the server may configure an indication node in the management tree of the gateway and indicate a way of determining a target device to the gateway by using the node value of the indication node. The server may also indicate a way of determining a target device to the gateway by sending a message. Determining a target device includes: in the device information stored in the gateway, searching for a target device meeting the condition, or according to the information reported by the devices in the local area network, searching for a target device meeting the condition.

The specific implementation of the embodiment of the present disclosure in practical applications is described in detail below.

EMBODIMENT 1

Figure 2A:
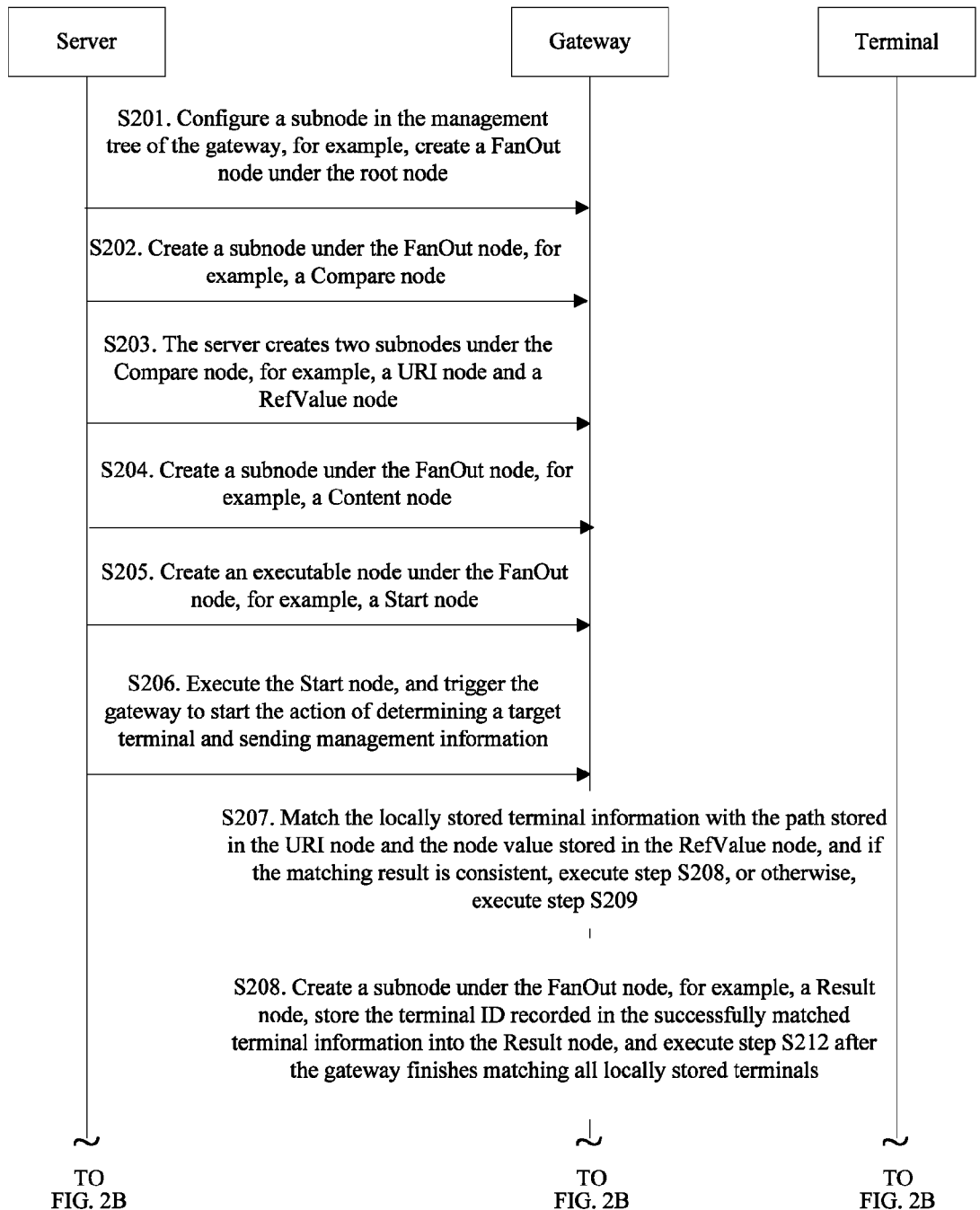

In the first embodiment of the present disclosure, a server configures subnodes in the management tree of a gateway and assigns values, and configures an executable node in the management tree. In one example, the server performs a Replace operation for all devices whose path is ./DevInfo/Man and whose "Man" (manufacturer) node value is "Huawei" in the local area network where the gateway is located, and replaces the node value of the "Ver" node in the ./Antivirus/Ver path of a device meeting the condition with "123." The processing procedure is shown in FIG. 2A and FIG. 2B, and specifically includes the following operations:

S201. The server configures a subnode in the management tree of the gateway. For example, the server creates a FanOut node under the root node (shown in FIG. 3), where the subnode under the FanOut node stores related information of batch management for target devices.

S202. The server creates a subnode under the FanOut node. For example, a Compare node (shown in FIG. 3), where the subnode under the Compare node stores target device condition information.

S203. The server creates two subnodes under the Compare node. For example, a URI (uniform resource identifier) node and a RefValue (reference value) node (shown in FIG. 3), stores the path of nodes to be matched into the URI node, and stores the node values of the nodes to be matched into the RefValue node.

S204. The server creates a subnode under the FanOut node. For example, a Content (content) node (shown in FIG. 3), and stores management information for target devices into the Content node in the XML or WBXML format.

For example, the management information stored in the Content node is as follows:

```
<Replace>
<CmdID>4</CmdID>
<Item>
<Target>
<LocURI>./Antivirus/Ver<LocURI>
<Target>
<Data>123</Data>
<Item>
</Replace>
```

The code describes the following management information: replacing the node value of the Ver node in the ./Antivirus/Ver path with "123".

S205. The server creates a subnode under the FanOut node. For example, a Start node (shown in FIG. 3), where the Start node is an executable node.

S206. The server executes the Start node, and triggers the gateway to start the action of determining a target device and sending management information.

Figure 3:
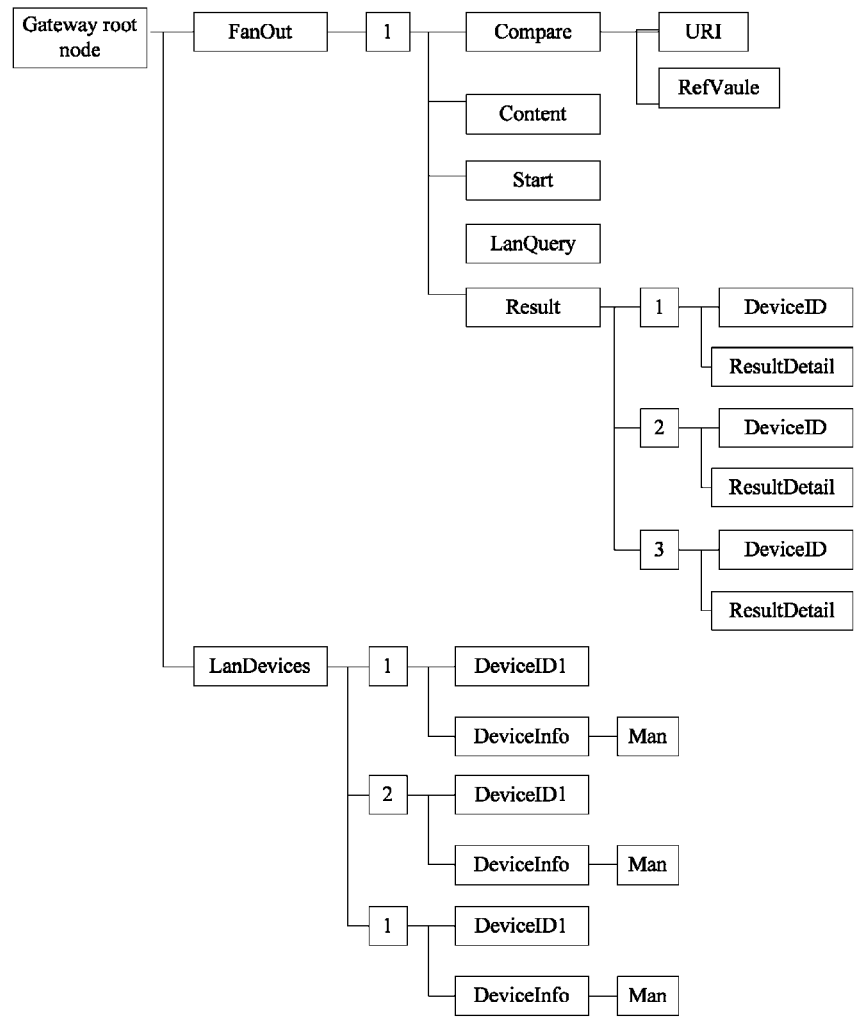
FIG. 3 is a schematic structural diagram of a management tree of a gateway according to an embodiment of the present disclosure.

S207. The gateway matches the locally stored device information (information stored in a non-Compare node, which is an example and is not limited. As shown in FIG. 3, device information is stored in the LanDevices (devices in the local area network (LAN)) node of the gateway, where the device information includes a device ID, node path information in the device stored in the form of subnodes, and corresponding node values) with the path stored in the URI node and the node value stored in the RefValue node, and if the matching result is consistent, the gateway executes step S208, or otherwise, the gateway executes step S209.

S208. The gateway creates a subnode under the FanOut node, for example, a Result (result) node (shown in FIG. 3), and stores the device ID recorded in the successfully matched device information into the Result node; after finishing matching all locally stored devices, the gateway executes step S212; as shown in FIG. 3, the Result node includes multiple subnodes, and the subnode of each subnode stores a piece of target device information, where the target device information includes a device ID, a result detail (ResultDetail), and so on, where the result detail is a management information execution result fed back by the corresponding device.

S209. The gateway initiates a session to all devices in the local area network in sequence, requesting to obtain the node values of the nodes to be matched and specified by the server, and obtains, through session interactions, the node values of the nodes to be matched that are reported by each device (if the device does not include the nodes to be matched, error information is returned), and executes step S210.

S210. The gateway compares the node values reported by the successfully matched devices with the information stored in the RefValue node, and if they are the same, executes step S211, or otherwise, ends the session.

S211. The gateway determines the devices whose comparison results are the same as target devices, and stores the device IDs of the target devices into the Result node created by the gateway, and then executes step S212.

S212. The gateway sends the management information stored in the Content node to the target device corresponding to each device ID stored in the Result node. If the management information is a common management command, the target device feeds back the execution result of the management information to the gateway, and the gateway ends the session and executes step S213: The gateway stores the execution result of the management information fed back by the corresponding target device into the ResultDetail node under the Result node. If the management command is a Sessionless command, the gateway ends the session after sending the management command.

If the management command is a common management command, the gateway further feeds back an execution result to the server. The specific implementation may be as follows: The gateway returns an OK message to the server, and subsequently the server obtains the feedback of the execution result from the result detail in the management tree of the gateway; or the gateway may also directly return the result detail to the server. If the management command is a Sessionless command, the gateway does not feed back the execution result to the server.

In the technical solution provided by the first embodiment of the present disclosure, the devices meeting the matching condition under the gateway are managed in batches by creating a subnode in the management tree and storing the matching condition and management command into the corresponding subnode. This provides conditions for the server to perform diversified and precise management. By using the gateway to determine the target device through matching, the burden of the server is reduced. Frequent sessions between the server and the gateway are decreased. Communication resources are saved.

In each embodiment of the present disclosure, if the server directly creates the subnodes under the FanOut node, the server may also query whether the corresponding subnodes exist before creating the subnodes, and if so, the server replaces the corresponding node values with the specified values in the current management operation, or if not, the server creates the corresponding subnodes and assigns values. If the server creates a subnode corresponding to the current management operation under the FanOut node every time when the server executes a management operation, the server may first create a subnode of the current management operation (such as node 1 in FIG. 3) under the FanOut node, and create each subnode to be created in the current operation under the subnode (node 1).

EMBODIMENT 2

Figure 4:
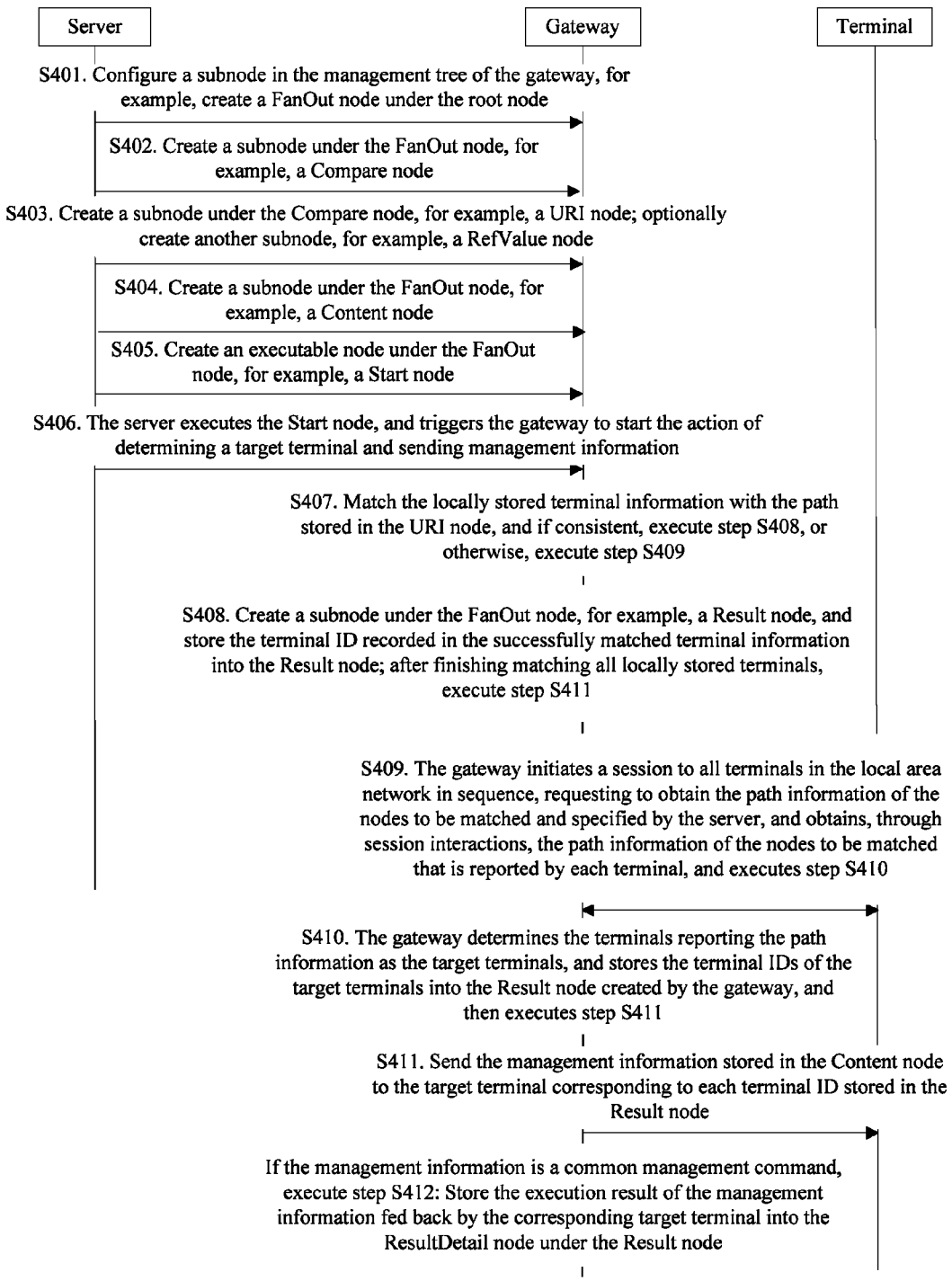
FIG. 4 is a signaling flowchart of a method according to a second embodiment of the present disclosure.

In the second embodiment of the present disclosure, a server configures subnodes in the management tree of a gateway and assigns values, and configures an executable node in the management tree of the gateway. In one example, the server performs a Replace operation for all devices whose path is ./DevInfo/Man and whose "Man" (manufacturer) node value is "Huawei" in the local area network where the gateway is located, and replaces the node value of the "Ver" (version) node in the ./Antivirus/Ver path of a device meeting the condition with "123." The processing procedure is shown in FIG. 4, and specifically includes the following operations:

S401. The server configures a subnode in the management tree of the gateway. For example, the server creates a FanOut node under the root node (shown in FIG. 3), where the subnode under the FanOut node stores the related information of batch management for target devices.

S402. The server creates a subnode under the FanOut node. For example, a Compare node (shown in FIG. 3), where the subnode under the Compare node stores target device condition information.

S403. The server creates a subnode under the Compare node. For example, a URI node (shown in FIG. 3), and stores the path of nodes to be matched into the URI node; optionally, the server may also create another subnode, for example, a RefValue node, used to store the node values of nodes to be matched.

S404. The server creates a subnode under the FanOut node. For example, a Content node (shown in FIG. 3), and stores management information for target devices into the Content node in the XML or WBXML format.

S405. The server creates a subnode under the FanOut node. For example, a Start node (shown in FIG. 3), where the Start node is an executable node.

S406. The server executes the Start node, and triggers the gateway to start the action of determining a target device and sending a management command.

S407. In the assumed scenario of this embodiment, if a Compare node exists, the node value of the node is null; in this case, the gateway matches the locally stored device information (information stored in a non-Compare node, which is an example and is not limited. Device information is stored in the LanDevices (devices in the local area network (LAN)) of the gateway, where the device information includes a device ID, node path information in the device stored in the form of subnodes, and corresponding node values) with the path stored in the URI node, and if consistent, executes step S408, or otherwise, executes step S409.

S408. The gateway creates a subnode under the FanOut node. For example, a Result node (shown in FIG. 3), and stores the device ID recorded in the successfully matched device information into the Result node; after finishing matching all locally stored devices, the gateway executes step S411; as shown in FIG. 3, the Result node includes multiple subnodes, and the subnode of each subnode stores a piece of target device information, where the target device information includes a device ID, a result detail, and so on.

S409. The gateway initiates a session to all devices in the local area network in sequence, requesting to obtain the path information of the nodes to be matched and specified by the server, and obtains, through session interactions, the path information of the nodes to be matched that is reported by each device (if the device does not include the nodes to be matched, error information is returned), and executes step S410.

S410. The gateway determines the devices reporting the path information as the target devices, and stores the device IDs of the target devices into the Result node created by the gateway, and then executes step S411.

S411. The gateway sends the management information stored in the Content node to the target device corresponding to each device ID stored in the Result node. If the management information is a common management command, the target device feeds back the execution result of the management command to the gateway, and the gateway ends the session and executes step S412: The gateway stores the execution result of the management information fed back by the corresponding target device into the ResultDetail node under the Result node. If the management command is a Sessionless command, the gateway ends the session after sending the management command.

If the management command is a common management command, the gateway further feeds back the execution result to the server. If the management command is a Sessionless command, the gateway does not feed back the execution result to the server.

In the technical solution provided by the second embodiment of the present disclosure, the devices meeting the matching condition under the gateway are managed in batches by creating a subnode in the management tree and storing the matching condition and management command into the corresponding subnode. This provides conditions for the server to perform diversified and precise management. By using the gateway to determine the target device through matching, the burden of the server is reduced. Frequent sessions between the server and the gateway are decreased. Communication resources are saved.

EMBODIMENT 3

Figure 5:
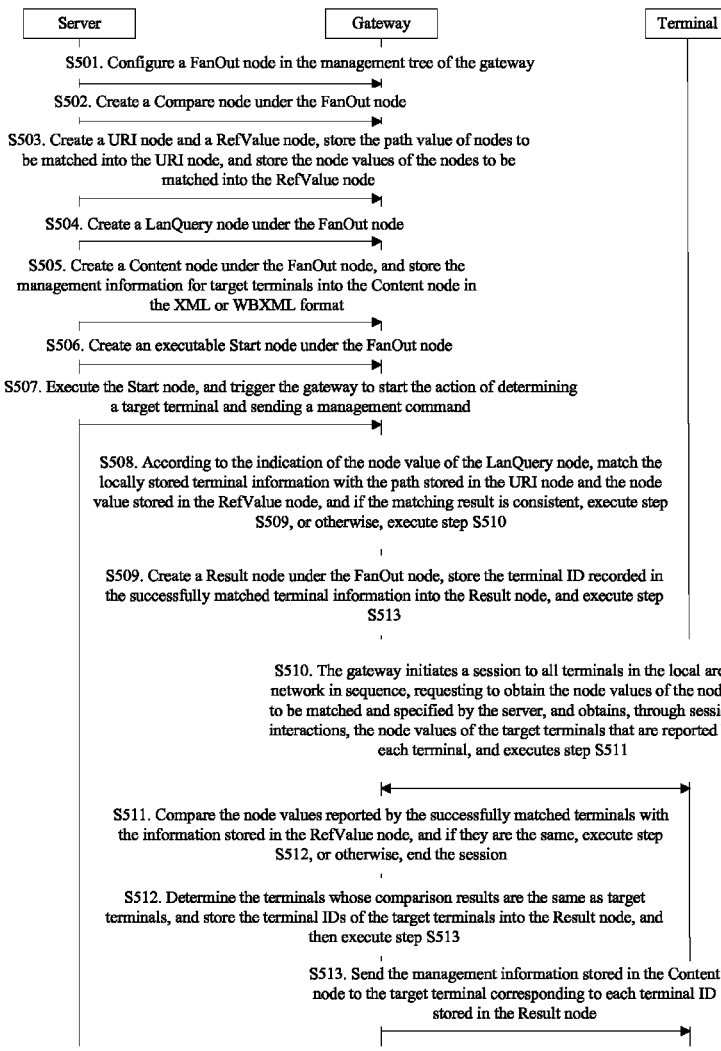
FIG. 5 is a signaling flowchart of a method according to a third embodiment of the present disclosure.

In the third embodiment of the present disclosure, a server configures subnodes in a gateway and assigns values, and configures an executable node. In one example, the server performs a Replace operation for all devices whose path is ./DevInfo/Man and whose "Man" (manufacturer) node value is "Huawei" in the local area network where the gateway is located, and replaces the node value of the Ver node in the ./Antivirus/Ver path of a device meeting the condition with "123." The processing procedure is shown in FIG. 5, and specifically includes the following operations:

S501. The server configures a subnode in the management tree of the gateway. For example, the server creates a FanOut node under the root node (shown in FIG. 3), where the FanOut node is used to store related information of batch management for target devices.

S502. The server creates a subnode under the FanOut node. For example, a Compare node (shown in FIG. 3), where the Compare node is used to store target device condition information.

S503. The server creates two subnodes under the Compare node. For example, a URI node and a RefValue node (shown in FIG. 3), stores the path of nodes to be matched into the URI node, and stores the node values of the nodes to be matched into the RefValue node.

S504. The server creates a subnode under the FanOut node. For example, a LanQuery (local area network query) node (shown in FIG. 3), where the node value of the node is a Boolean function value, used to indicate whether the gateway performs local matching to determine target devices (for example, "True" indicates that the gateway performs local matching, and "False" indicates that the gateway does not perform local matching). In this embodiment, the node value of the LanQuery node is "True".

S505. The server creates a subnode under the FanOut node. For example, a Content node (shown in FIG. 3), and stores a management command for target devices into the Content node in the XML or WBXML format.

S506. The server creates a subnode under the FanOut node. For example, a Start node (shown in FIG. 3), where the Start node is an executable node.

S507. The server executes the Start node, and triggers the gateway to start the action of determining a target device and sending a management command.

S508. The gateway parses the node value of the LanQuery node, matches, according to the indication, the locally stored device information (information stored in a non-Compare node) with the path stored in the URI node and the node value stored in the RefValue node, and if the matching result is consistent, determines that the corresponding device is a target device and executes step S509, or otherwise, executes step S510.

S509. The gateway creates a subnode under the FanOut node. For example, a Result node (shown in FIG. 3), and stores the device ID recorded in the successfully matched device information into the Result node and executes step S513. As shown in FIG. 3, the Result node includes multiple subnodes and each subnode stores a piece of target device information, where the target device information includes a device ID, a result detail, and so on.

S510. The gateway initiates a session to all devices in the local area network in sequence, requesting to obtain the node values of the nodes to be matched and specified by the server, and obtains, through session interactions, the node values of the target devices that are reported by each device (if the device does not include the nodes to be matched, error information is returned), and executes step S511.

S511. The gateway compares the node value reported by the device with the information stored in the RefValue node, and if they are the same, executes step S512, or otherwise, ends the session.

S512. The gateway determines the devices whose comparison results are the same as target devices, and stores the device IDs of the target devices into the Result node created by the gateway, and then executes step S513.

S513. The gateway sends the management information stored in the Content node to the target device corresponding to each device ID stored in the Result node. If the management information is a common management command, the target device feeds back the execution result of the management command to the gateway, and the gateway ends the session. If the management information is a Sessionless command, the gateway ends the session after sending the management command.

If the management command is a common management command, the gateway further feeds back the execution result to the server. If the management command is a Sessionless command, the gateway does not feed back the execution result to the server.

In the technical solution provided by the third embodiment of the present disclosure, the server manages the devices meeting the matching condition under the gateway in batches by creating a new subnode in the management tree and storing the matching condition into the subnode and extending the existing protocol. This provides conditions for the server to perform diversified and precise management. By using the gateway to determine the target device through matching, the burden of the server is reduced. In addition, by triggering the FanOut action while sending a management command, the frequent sessions between the server and the gateway are decreased. Communication resources are saved.

EMBODIMENT 4

Figure 6:
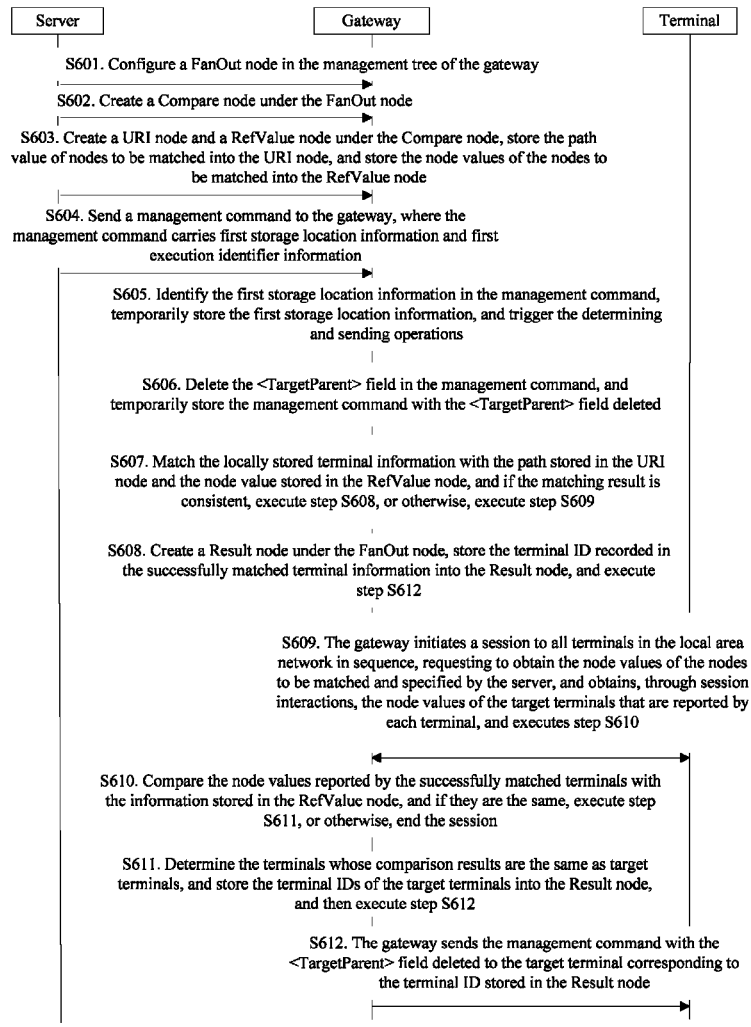
FIG. 6 is a signaling flowchart of a method according to a fourth embodiment of the present disclosure.

In the fourth embodiment of the present disclosure, a server performs a Replace operation for all devices whose path is ./DevInfo/Man and whose "Man" (manufacturer) node value is, for example, "Huawei" in a local area network where a gateway is located, and replaces the node value of the version node in the ./antivirus_data/version path of a device meeting the condition with, for example, "antivirus-inc/2002213a/1". The processing procedure is shown in FIG. 6, and specifically includes the following operations:

S601. The server creates a subnode in the management tree of the gateway. For example, the server creates a FanOut node under the root node (shown in FIG. 3), where the FanOut node is used to store related information of batch management for target devices.

S602. The server creates a subnode under the FanOut node. For example, a Compare node (shown in FIG. 3), where the Compare node is used to store target device condition information.

S603. The server creates two subnodes under the Compare node. For example, a URI node and a RefValue node (shown in FIG. 3), stores the path of nodes to be matched into the URI node, and stores the node values of the nodes to be matched into the RefValue node.

S604. The server sends a management command to the gateway, where the management command carries first storage location information and first execution identifier information, where the first storage location information is used to describe the location for storing the target device condition information in the gateway, and the first execution identifier information is used to instruct the gateway to determine a target device and send a management command to the target device.

A specific field in the management command is extended to carry the first storage location information and the first execution identifier information, which is an example but not a limitation. The format of the management command is as follows:

```
<Replace>
<Item>
<TargetParent>
<LocURI>FanOut=./FanOut/1/Compare</LocURI>
```

-continued

```
    </TargetParent>
    <Target>
    <LocURI>./antivirus_data/version</LocURI>
    </Target>
    <Data>antivirus-inc/2002213a/1</Data>
    </Item>
    </Replace>
```

The <TargetParent> field carries the first storage location information (./FanOut/1/Compare) and the first execution identifier information, the <Target> field describes the path of nodes to be operated, and the <Data> field describes the content to be replaced.

S605. The gateway identifies the first storage location information by identifying the FanOut key word in the <TargetParent> field in the management command, temporarily stores the first storage location information, and triggers the determining and sending operations.

S606. The gateway deletes the <TargetParent> field in the management command, and temporarily stores the management command with the <TargetParent> field deleted.

S607. The gateway matches the locally stored device information (information stored in a non-Compare node) with the path stored in the URI node and the node value stored in the RefValue node, and if the matching result is consistent, determines that the corresponding device is a target device and executes step S608, or otherwise, executes step S609.

S608. The gateway creates a subnode under the FanOut node. For example, a Result node, stores the device ID recorded in the successfully matched device information into the Result node, and executes step S612.

S609. The gateway initiates a session to all devices in the local area network in sequence, requesting to obtain the node values of the nodes to be matched and specified by the server, and obtains, through session interactions, the node values of the nodes to be matched that are reported by each device (if the device does not include the nodes to be matched, error information is returned), and executes step S610.

S610. The gateway compares the node value reported by the device with the information stored in the RefValue node, and if they are the same, executes step S611, or otherwise, ends the session.

S611. The gateway determines the devices whose comparison results are the same as target devices, and stores the device IDs of the target devices into the Result node created by the gateway, and then executes step S612.

S612. The gateway sends the management command with the <TargetParent> field deleted to the target device corresponding to the device ID stored in the Result node. If the management command is a common management command, the target device feeds back the execution result of the management command to the gateway, and the gateway ends the session. If the management command is a Sessionless command, the gateway ends the session after sending the management command.

If the management command is a common management command, the gateway further feeds back the execution result to the server. If the management command is a Sessionless command, the gateway does not feed back the execution result to the server.

In the technical solution provided by the fourth embodiment of the present disclosure, the server manages the devices meeting the matching condition under the gateway in batches by creating a new subnode in the management tree and storing the matching condition into the subnode and extending the existing protocol. This provides conditions for the server to perform diversified and precise management. By using the gateway to determine the target device through matching, the burden of the server is reduced. In addition, by triggering the matching and FanOut action while sending a management command, the frequent sessions between the server and the gateway are decreased. Communication resources are saved.

Figure 7:
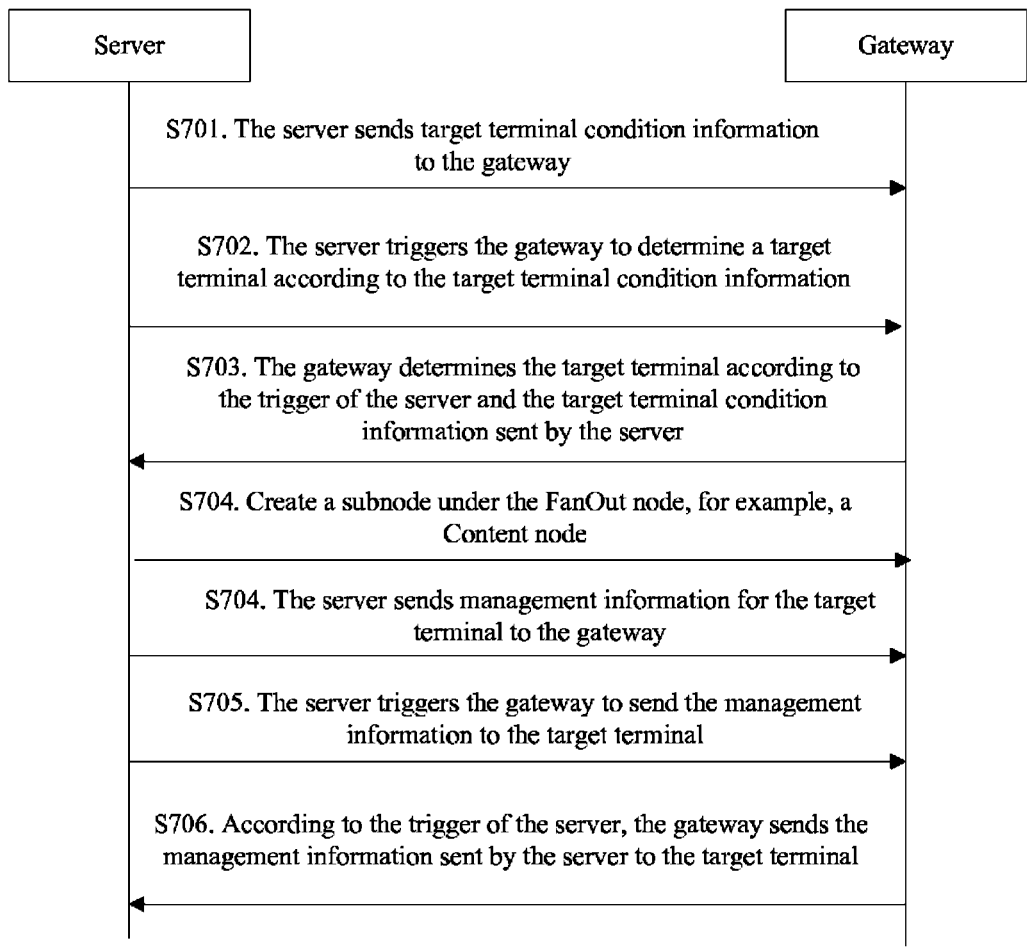
FIG. 7 is a signaling flowchart of another method according to an embodiment of the present disclosure.

An embodiment of the present disclosure also provides a method for managing devices in batches in a DM system. The processing procedure is shown in FIG. 7, and the specific implementation is as follows:

On the server side:

S701. The server sends target device condition information to the gateway, where there may be one or more pieces of target device condition information, which describes the characteristics of one or more types of devices.

S702. The server triggers the gateway to determine a target device according to the target device condition information.

On the gateway side:

S703. The gateway determines the target device according to the trigger of the server and the target device condition information sent by the server.

On the server side:

S704. The server sends management information for the target device to the gateway, where the management information may be a common management command or a Sessionless command.

S705. The server triggers the gateway to send the management information to the target device.

On the gateway side:

S706. According to the trigger of the server, the gateway sends the management information sent by the server to the target device.

If the management information is a Sessionless command, the management operation is ended. If the management information is a common management command, the target device feeds back the execution result of the management command to the gateway, and the gateway feeds back the execution result to the server.

In the embodiment of the present disclosure, the server sends target device condition information and a management command to the gateway in a management operation, and the gateway determines, according to the target device condition information, one or more target devices meeting the condition and sends the management command to these target devices, thereby managing a type of target devices in batches. Compared with the prior art, the solution provided by the embodiment of the present disclosure is easy to implement, involves few operations, and may manage multiple specific devices by changing the target device condition information.

The specific implementation of the embodiment of the present disclosure in practical applications is described in detail below.

EMBODIMENT 5

Figure 8A:
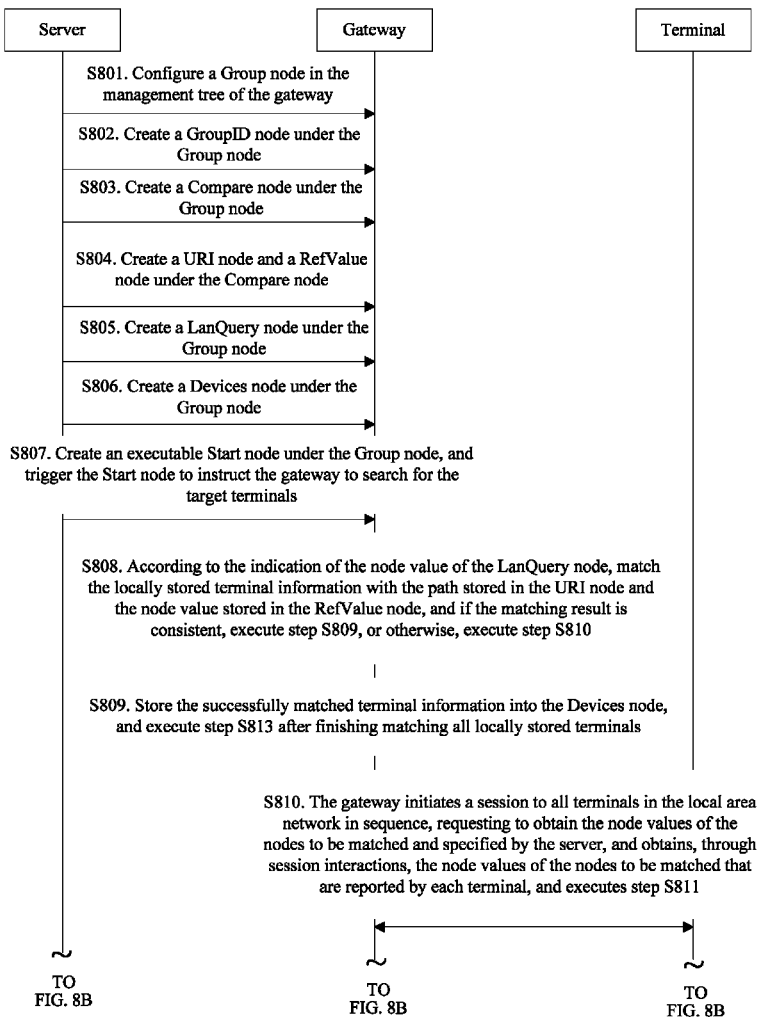
FIG. 8A and FIG. 8B are a signaling flowchart of a method according to a fifth embodiment of the present disclosure.
Figure 8B:
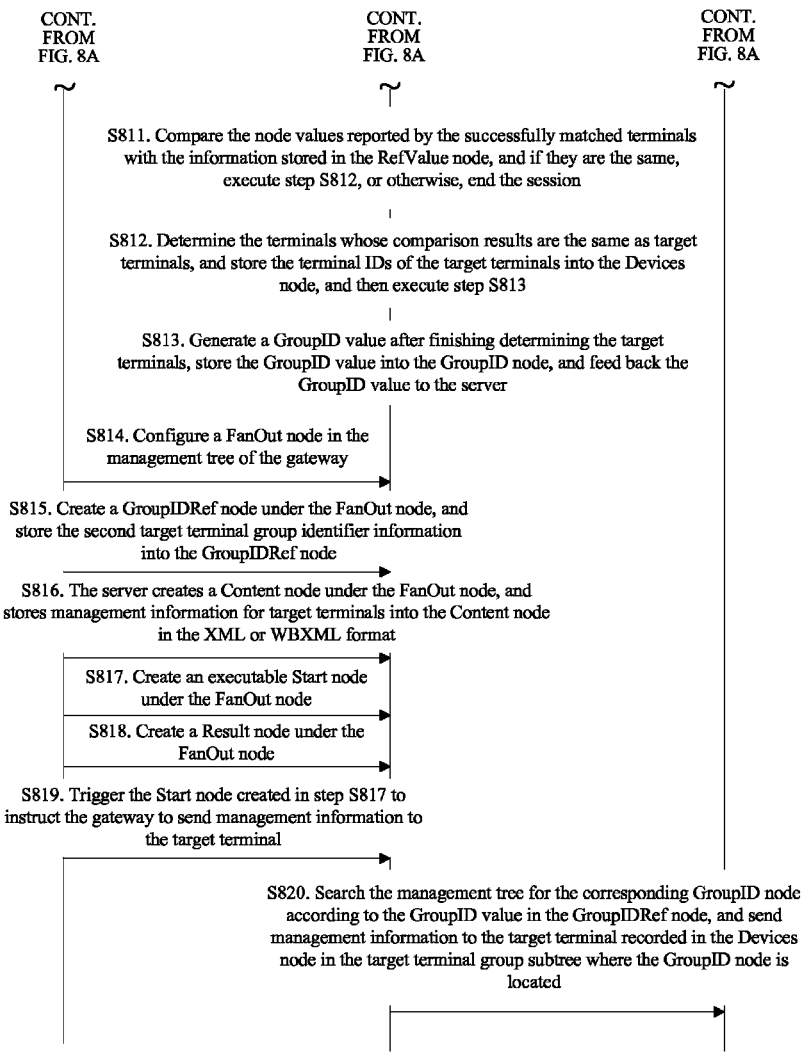

In the third embodiment, a server configures a management subtree in the management tree of a gateway and stores management related information into a subnode in the management subtree. In one example, the server performs a Replace operation for all devices whose path is ./DevInfo/Man and whose "Man" (manufacturer) node value is "Huawei" in the local area network where the gateway is located, and replaces the node value of the Ver node in the ./Antivirus/Ver path of a device meeting the condition with "123". The processing procedure is shown in FIG. 8A and FIG. 8B, and specifically includes the following operations:

The server configures a target device group subtree in the management tree of the gateway. For example, the Group management subtree shown in FIG. 9, and the specific implementation is as follows:

S801. The server configures a subnode in the management tree of the gateway. For example, a Group node, where the subnode under the Group node stores the related information of the target device group.

S802. The server creates a subnode under the Group node. For example, a GroupID node, used to store a first target device group identifier generated by the gateway.

S803. The server creates a subnode under the Group node. For example, a Compare node, where the subnode under the Compare node stores one or multiple pieces of target device condition information.

S804. The server creates two subnodes under the Compare node. For example, a URI node and a RefValue node, stores the path of nodes to be matched into the URI node, and stores the node values of the nodes to be matched into the RefValue node.

S805. The server creates a subnode under the Group node. For example, a LanQuery node, where the node value of the node is a Boolean function value, used to indicate whether the gateway performs local matching to determine target devices (for example, "True" indicates that the gateway performs local matching, and "False" indicates that the gateway does not perform local matching). In this embodiment, the node value of the LanQuery node is "True".

S806. The server creates a subnode under the Group node. For example, a Devices node (namely, a query result node), where the subnode under the node is used to store the information of all target devices determined by the gateway.

S807. The server creates an executable node under the Group node. For example, a Start node, and triggers the Start node to instruct the gateway to search for the target devices.

S808. According to the indication of the node value of the LanQuery node, the gateway matches the locally stored device information (information stored in a non-Compare node. On the gateway, some information of the devices in the local area network is mapped into the management tree for storage) with the path stored in the URI node and the node value stored in the RefValue node, and if the matching result is consistent, the gateway executes step S809, or otherwise, the gateway executes step S810.

S809. The gateway stores the successfully matched device information into the Devices node, and executes step S813 after finishing matching all locally stored devices; the Devices node includes multiple subnodes, and the subnode under each subnode stores a piece of target device information, where the target device information includes the device ID.

S810. If the locally stored device information does not include any target device meeting the condition, the gateway initiates a session to all devices in the local area network in sequence, requesting to obtain the node values of the nodes to be matched and specified by the server, and obtains, through session interactions, the node values of the nodes to be matched that are reported by each device (if the device does not include the nodes to be matched, error information is returned), and executes step S811.

S811. The gateway compares the node values reported by the successfully matched devices with the information stored in the RefValue node, and if they are the same, executes step S812, or otherwise, ends the session.

S812. The gateway determines the devices whose comparison results are the same as target devices, and stores the device IDs of the target devices into the Devices node, and then executes step S813.

S813. The gateway generates a GroupID value (the GroupID value may be randomly generated, or may also be generated according to a rule, and is used to identify the corresponding target device group subtree) after finishing determining the target devices, stores the GroupID value into the GroupID node, and feeds back the GroupID value to the server.

Figure 9:
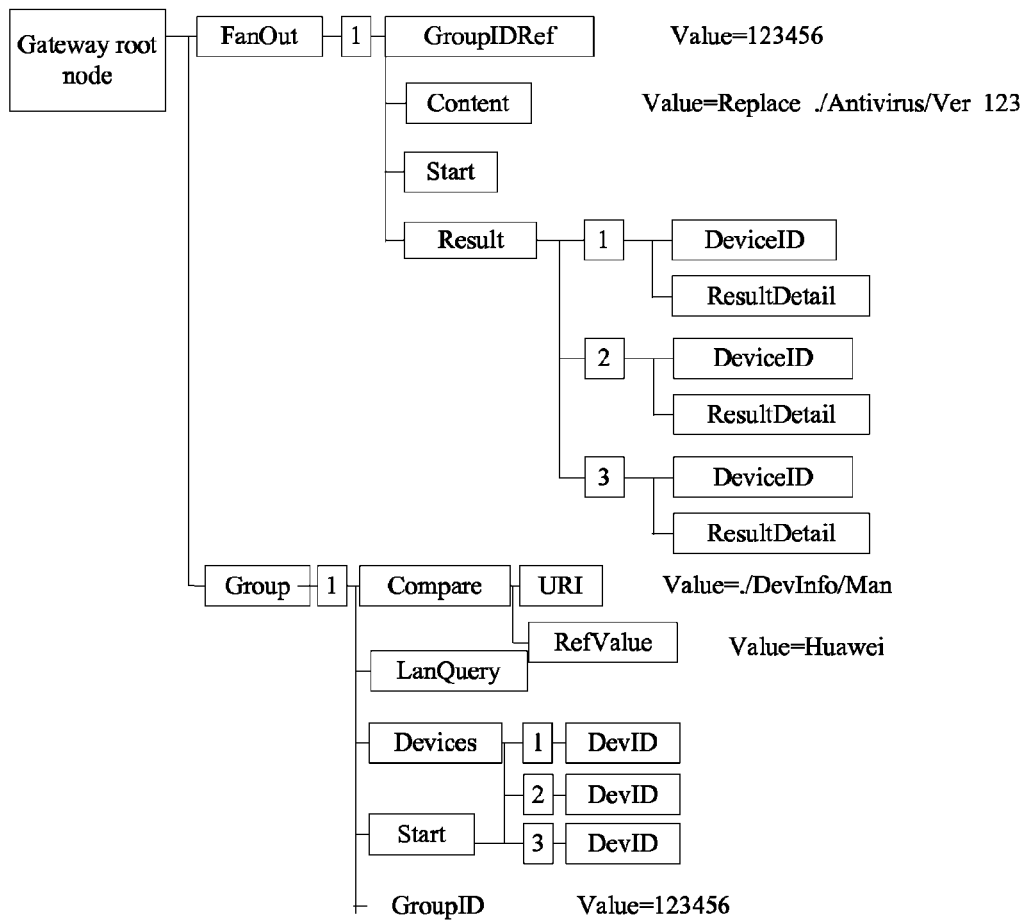
FIG. 9 is a schematic structural diagram of a management tree of another gateway according to an embodiment of the present disclosure.

After receiving the GroupID, the server creates a device management subtree in the management tree of the gateway, for example, the FanOut management subtree shown in FIG. 9, and the implementation is as follows:

S814. The server configures a subnode in the management tree of the gateway, for example, a FanOut node, where the subnode under the node stores the related information of batch management.

S815. The server creates a subnode under the FanOut node, for example, a GroupIDRef node, and stores a second target device group identifier in the node, where the second target device group identifier points to the target device group corresponding to the management information of the current management.

S816. The server creates a subnode under the FanOut node, for example, a Content node, and stores management information for target devices into the Content node in the XML or WBXML format.

For example, the management information stored in the Content node is as follows:

```
<Replace>
<CmdID>4</CmdID>
<Item>
<Target>
<LocURI>./Antivirus/Ver<LocURI>
<Target>
<Data>123</Data>
<Item>
</Replace>
```

The code describes the following management information: replacing the node value of the Ver node in the ./Antivirus/Ver path with "123".

S817. The server creates an executable node under the FanOut node. For example, a Start node.

S818. The server creates a subnode under the FanOut node. For example, a Result node, where the subnode under the node stores all target devices determined by the gateway, and the feedback information of the execution result of the management command corresponding to each target device.

S819. The server triggers the Start node created in step S817 to instruct the gateway to send management information to the target device.

S820. The gateway searches the management tree for the corresponding GroupID node according to the GroupID value in the GroupIDRef node, and sends management information to the target device recorded in the Devices node in the target device group subtree where the GroupID node is located.

If the management information is a Sessionless command, the current batch management operation is ended. If the management information is common management information, the target device also feeds back the execution result of the management command. The gateway stores the execution result of the management command fed back by the target device into the corresponding result detail in the Result node. The gateway feeds back an execution result to the server. The specific implementation may be as follows: The gateway returns an OK message to the server, and subsequently the server obtains the feedback of the execution result from the result detail in the management tree of the gateway; or the gateway may also directly return the result detail to the server.

In each embodiment of the present disclosure, if the server has created a target device group subtree in the management tree, the server may directly use the created target device group subtree.

In the fifth embodiment, the device group may be used manage the devices meeting the specific condition in batches, and the device group may be reused, which saves communication resources and decreases frequent sessions.

EMBODIMENT 6

Figure 10A:
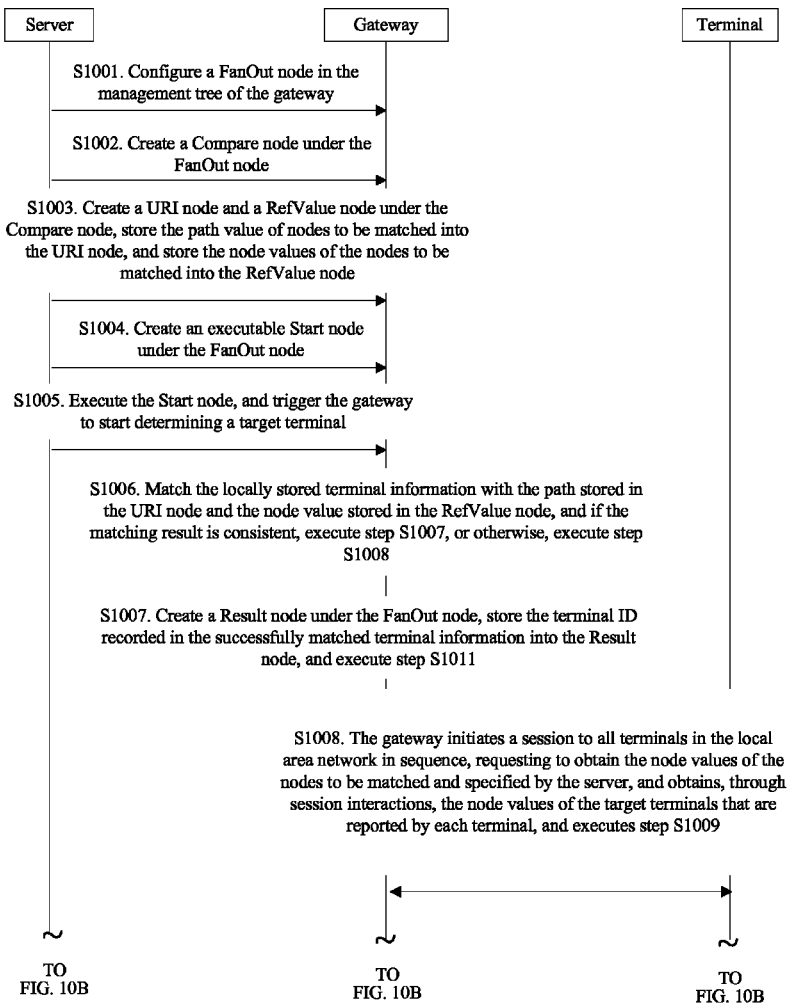
FIG. 10A and FIG. 10B are a signaling flowchart of a method according to a sixth embodiment of the present disclosure.
Figure 10B:
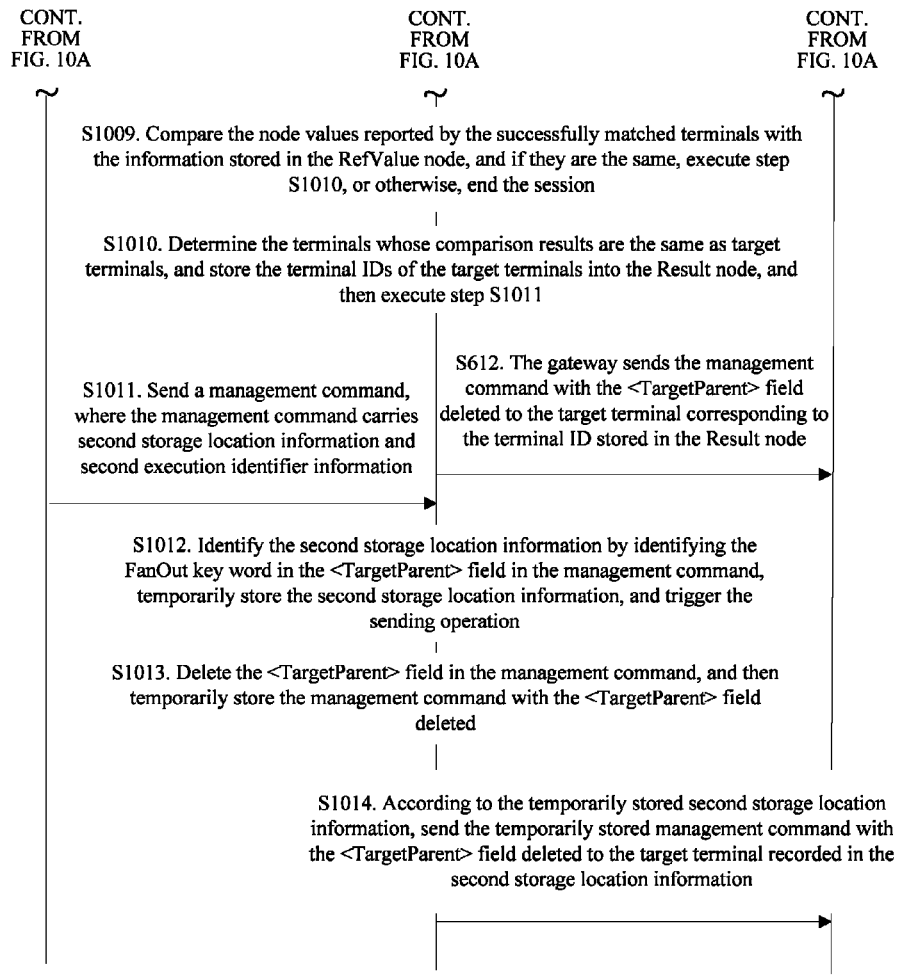

In the sixth embodiment of the present disclosure, the server performs a Replace operation for all devices whose path is ./DevInfo/Man and whose "Man" (manufacturer) node value is, for example, "Huawei" in a local area network where a gateway is located, and replaces the node value of the version node in the ./antivirus_data/version path of a device meeting the condition with, for example, "antivirus-inc/ 20020213a/1". The processing procedure is shown in FIG. 10A and FIG. 10B, and specifically includes the following operations:

S1001. The server creates a subnode in the management tree of the gateway. For example, the server creates a FanOut node under the root node (shown in FIG. 3), where the FanOut node is used to store related information of batch management for target devices.

S1002. The server creates a subnode under the FanOut node. For example, a Compare node (shown in FIG. 3), where the Compare node is used to store target device condition information.

S1003. The server creates two subnodes under the Compare node. For example, a URI node and a RefValue node (shown in FIG. 3), stores the path of nodes to be matched into the URI node, and stores the node values of the nodes to be matched into the RefValue node.

S1004. The server creates a subnode under the FanOut node. For example, a Start node (shown in FIG. 3), where the Start node is an executable node.

S1005. The server executes the Start node, and triggers the gateway to start determining a target device.

S1006. The gateway matches the locally stored device information (information stored in a non-Compare subnode) with the path stored in the URI node and the node value stored in the RefValue node, and if the matching result is consistent, determines that the corresponding device is a target device and executes step S1007, or otherwise, executes step S1008.

S1007. The gateway creates a subnode under the FanOut node. For example, a Result node, and stores the device ID recorded in the successfully matched device information into the Result node created by the gateway, and then step S1011 is executed.

S1008. The gateway initiates a session to all devices in the local area network in sequence, requesting to obtain the node values of the nodes to be matched and specified by the server, and obtains, through session interactions, the node values of the nodes to be matched that are reported by each device (if the device does not include the nodes to be matched, error information is returned), and executes step S1009.

S1009. The gateway matches the node value reported by the device with the information stored in the RefValue node, and if they are the same, executes step S1010, or otherwise, ends the session.

S1010. The gateway determines the successfully matched devices as target devices, stores the device IDs of the target devices into the Result node, and ends the session, and then step S1011 is executed.

S1011. The server sends a management command to the gateway, where the management command carries second storage location information and second execution identifier information, where the second storage location information is used to describe the location for storing the device information successfully matched in the processing procedure in the gateway, and the second execution identifier information is used to instruct the gateway to send a management command to the target device recorded in the successfully matched device information.

A specific field in the management command is extended by the server to carry the second storage location information and the second execution identifier information, which is an example and is not limited. The format of the management command is as follows:

```
<Replace>
<Item>
<TargetParent>
<LocURI>FanOut=./FanOut/1/Result<LocURI>
</TargetParent>
<Target>
<LocURI>./antivirus_data/version</LocURI>
</Target>
<Data>antivirus-inc/20020213a/1</Data>
</Item>
</Replace>
```

The <TargetParent> field carries the second storage location information and the second execution identifier information.

S1012. The gateway identifies the second storage location information by identifying the FanOut key word in the <TargetParent> field in the management command, temporarily stores the second storage location information, and triggers the sending operation.

S1013. The gateway deletes the <TargetParent> field in the management command, and then temporarily stores the management command with the <TargetParent> field deleted.

S1014. According to the temporarily stored second storage location information, the gateway sends the temporarily stored management command with the <TargetParent> field deleted to the target device recorded in the second storage location information, and if the management command is a common management command, the target device further feeds back the execution result of the management command to the gateway, or if the management command is a Sessionless command, the target device does not feed back the execution result.

If the management command is a common management command, the gateway further feeds back the execution result to the server. If the management command is a Sessionless command, the gateway does not feed back the execution result to the server.

In the technical solution provided by the sixth embodiment of the present disclosure, the server manages the devices meeting the matching condition under the gateway in batches by creating a new subnode in the management tree and storing the matching condition into the subnode and extending the existing protocol. This provides conditions for the server to perform diversified and precise management. By using the gateway to determine the target device through matching, the burden of the server is reduced. In addition, by triggering the FanOut action while sending a management command, the frequent sessions between the server and the gateway are decreased. Communication resources are saved.

EMBODIMENT 7

Figure 11:
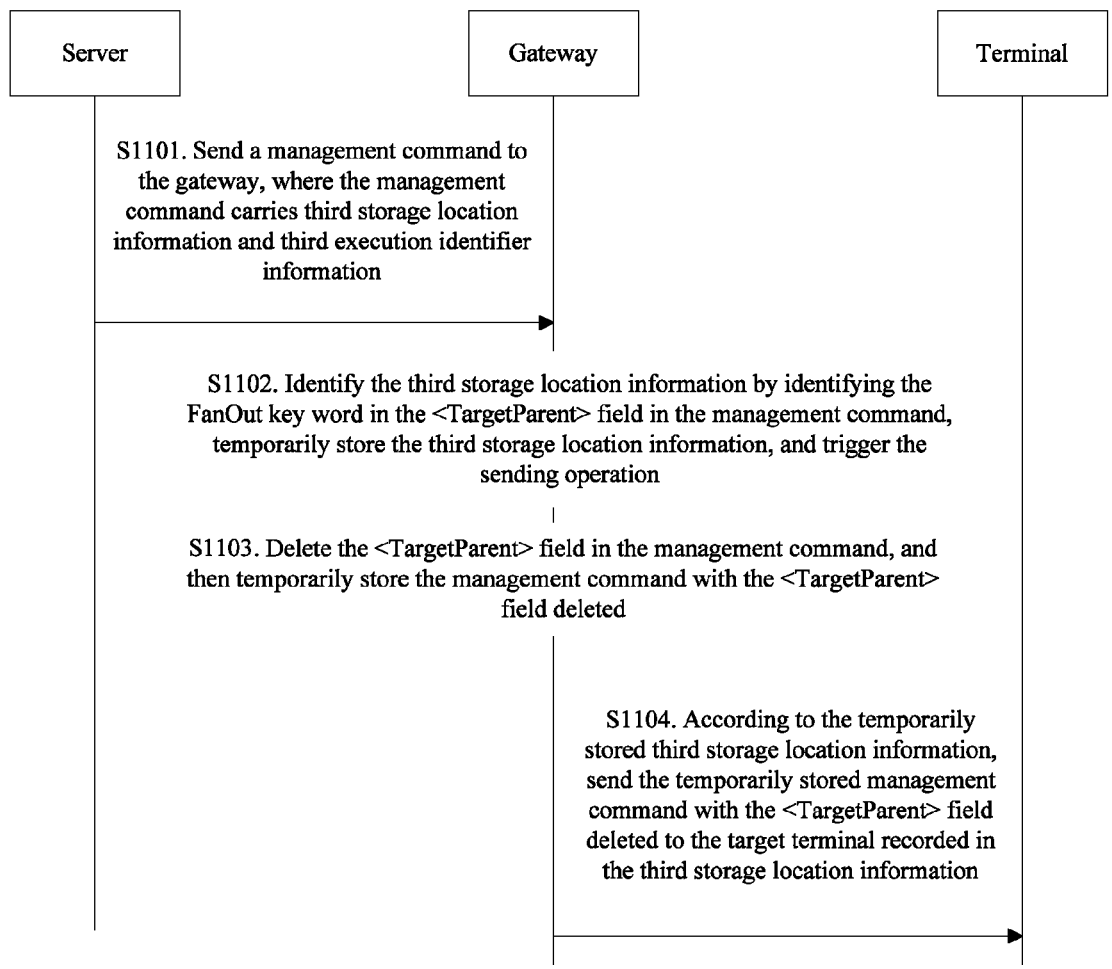
FIG. 11 is a signaling flowchart of a method according to a seventh embodiment of the present disclosure.

In the seventh embodiment of the present disclosure, a server performs a Replace operation for all devices whose path is ./DevInfo/Man and whose "Man" (manufacturer) node value is, for example, "Huawei" in a local area network where a gateway is located, and replaces the node value of the Ver node in the ./Antivirus/Ver path of a device meeting the condition with, for example, "123". If the gateway stores the search result of the target device meeting the current search condition in the previous batch management operation, the processing procedure is shown in FIG. 11, and specifically includes the following operations:

S1101. The server sends a management command to the gateway, where the management command carries third storage location information and third execution identifier information, where the third storage location information is used to describe the location for storing device information determined in a historical management operation in the gateway, and the third execution identifier information is used to instruct the gateway to send a management command to the target device recorded in the successfully matched device information.

A specific field in the management command is extended by the server to carry the third storage location information and the third execution identifier information, which is an example and is not limited. The format of the management command is as follows:

```
<Replace>
<Item>
<TargetParent>
<LocURI>FanOut=./FanOut/0/Result<LocURI>
</TargetParent>
<Target>
<LocURI>./antivirus_data/version</LocURI>
</Target>
<Data>antivirus-inc/20020213a/1</Data>
</Item>
</Replace>
```

The <TargetParent> field carries the third storage location information and the third execution identifier information.

S1102. The gateway identifies the third storage location information by identifying the FanOut key word in the <TargetParent> field in the management command, temporarily stores the third storage location information, and triggers the sending operation.

S1103. The gateway deletes the <TargetParent> field in the management command, and then temporarily stores the management command with the <TargetParent> field deleted.

S1104. According to the temporarily stored third storage location information, the gateway sends the temporarily stored management command with the <TargetParent> field deleted to the target device recorded in the third storage location information, and if the management command is a common management command, the target device further feeds back the execution result of the management command to the gateway, or if the management command is a Sessionless command, the target device does not feed back the execution result.

If the management command is a common management command, the gateway further feeds back the execution result to the server. If the management command is a Sessionless command, the gateway does not feed back the execution result to the server.

In the technical solution provided by the seventh embodiment of the present disclosure, the server manages the devices meeting the matching condition under the gateway in batches by creating a new subnode in the management tree and storing the matching condition into the subnode and extending the existing protocol. This provides conditions for the server to perform diversified and precise management. By using the gateway to determine the target device through matching, the burden of the server is reduced. In addition, by triggering the FanOut action while sending the management command, and reusing the historical target device group, the frequent sessions required by the batch management are greatly decreased, and communication resources are saved.

EMBODIMENT 8

Figure 12:
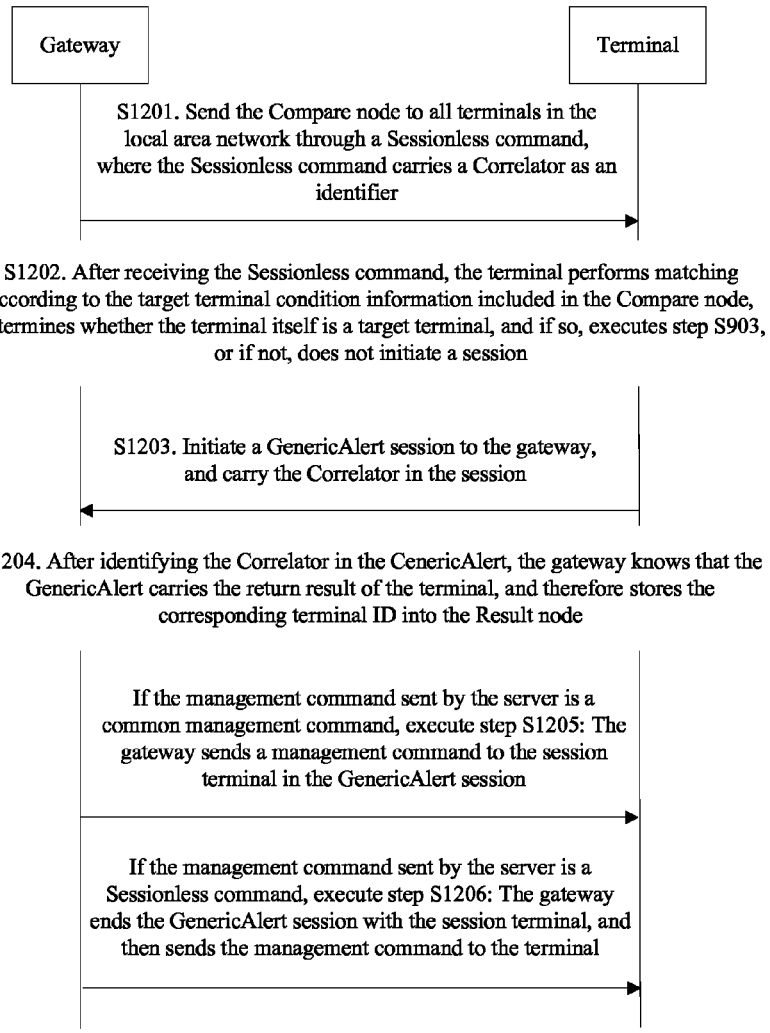
FIG. 12 is a signaling flowchart of a method according to an eighth embodiment of the present disclosure.

In the implementation process in which the server manages devices in batches in the first to seventh embodiments, when the gateway initiates a session to the device to determine a target device and sends a management command to the target device, the device in the local area network may also perform matching; the processing procedure is shown in FIG. 12, and specifically includes the following operations:

S1201. The gateway sends the Compare node to all devices in the local area network through a Sessionless command, where the Sessionless command carries a Correlator (correlator) as an identifier.

S1202. After receiving the Sessionless command, the device performs matching according to the target device condition information included in the Compare node, determines whether the device itself is a target device, and if so, executes step S1203, or if not, does not initiate a session.

S1203. The device initiates a GenericAlert session to the gateway, and carries the Correlator in the session.

S1204. After identifying the Correlator in the CenericAlert, the gateway knows that the GenericAlert carries the return result of the device, and therefore stores the corresponding device ID into the Result node.

If the management command sent by the server is a common management command, step S1205 is executed: The gateway sends a management command to the session device (namely, the target device) in the GenericAlert session; if the management command sent by the server is a Sessionless command, step S1206 is executed: The gateway ends the GenericAlert session with the session device, and then sends the management command to the device.

In the technical solution provided by the eighth embodiment of the present disclosure, the server manages the devices meeting the matching condition under the gateway in batches by creating a new subnode in the management tree and storing the matching condition into the subnode and extending the existing protocol. This provides conditions for the server to perform diversified and precise management. By using the gateway to determine the target device through matching, the burden of the server is reduced. In addition, when session resources are in shortage because a large batch of devices are managed in the gateway, the device is used to determine whether the device itself is a target device to decrease the burden of the gateway; the sessionless command is used to decrease the direct and frequent sessions between the gateway and the device and save communication resources.

In some embodiments, all or a part of the steps of the foregoing method embodiments can be implemented by hardware instructed by a program. In other embodiments, the program may be stored in a computer-readable storage medium. When being executed, the program performs the steps of the foregoing method embodiments. The storage medium may be any medium capable of storing program codes, for example, a ROM, a RAM, a magnetic disk, and a CD-ROM.

Figure 13:
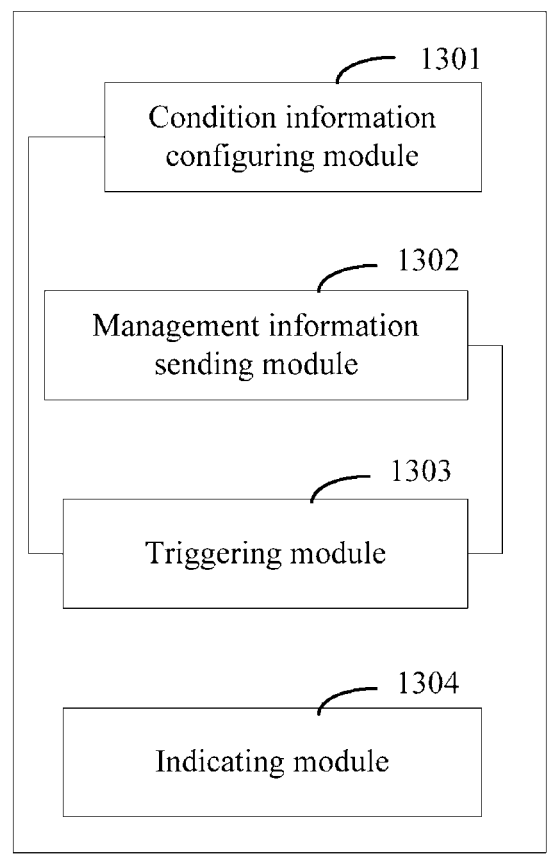
FIG. 13 is a schematic structural diagram of a server according to an embodiment of the present disclosure.

An embodiment of the present disclosure also provides a server in a DM system. The structure of the server is shown in FIG. 13, and the specific structure includes: a condition information configuring module 1301, a management information sending module 1302, and a triggering module 1303.

The condition information configuring module 1301 is adapted to send target device condition information to a gateway, where there may be one or more pieces of target device condition information, which describes the characteristics of one or more types of devices.

The management information sending module 1302 is adapted to send management information for a target device to the gateway, where the management information may be a common management command or a Sessionless command.

The triggering module 1303 is adapted to trigger the gateway to determine the target device according to the target device condition information and trigger the gateway to send the management information to the target device.

The server provided by the embodiment of the present disclosure sends target device condition information and a management command to the gateway in a management operation, so that the gateway determines, according to the target device condition information, one or more target devices meeting the condition and sends the management command to these target devices, thereby managing a type of target devices in batches. Compared with the prior art, the solution provided by the embodiment of the present disclosure is easy to implement, involves few operations, and may manage multiple specific devices by changing the target device condition information.

The condition information configuring module 1301 is specifically adapted to configure a management information node in the management tree of the gateway, and store the target device condition information into the management information node in the form of node values. The target device condition information may specifically be the path of nodes to be matched and the node values of the nodes to be matched, that is, the devices including the nodes to be matched (both the path and the node values are consistent) are determined as the target devices, and the target devices are managed in batches. The target device condition information may also be the path of the nodes to be matched, that is, the devices including the nodes to be matched (the path is consistent) are determined as the target devices, and the target devices are managed in batches.

The server provided by the embodiment of the present disclosure may further include an indicating module 1304, adapted to configure an indication node in the management tree of the gateway, and indicate, through the node value of the indication node, a way of determining a target device to the gateway. Determining a target device includes: in the device information stored in the gateway, searching for a target device meeting the condition, or according to the information reported by the devices in the local area network, searching for a target device meeting the condition.

The management information sending module 1302 is specifically adapted to configure a management information node in the management tree of the gateway, and store the management information into the management information node in the form of node values. In addition, the management information sending module 1302 may further be adapted to send management information through a management command carrying first storage location information and first execution identifier information, where the first storage location information is used to describe the location for storing the target device condition information in the gateway, and the first execution identifier information is used to instruct the gateway to determine a target device according to the target device condition information and send management information to the target device.

An embodiment of the present disclosure also provides a server in a DM system. The structure of the server is shown in FIG. 13, and the specific structure includes: a condition information configuring module 1301, adapted to send target device condition information to a gateway, where there may be one or more pieces of target device condition information, which describes the characteristics of one or more types of devices; a triggering module 1303, adapted to trigger the gateway to determine a target device according to the target device condition information; and a management information sending module 1302, adapted to send management information for the target device to the gateway after the gateway completes the operation of determining the target device, where the management information may be a common management command or may be a Sessionless command, and the triggering module 1303 is further adapted to trigger the gateway to send the management information to the target device after the management information sending module 1302 completes the work.

The server provided by the embodiment of the present disclosure sends target device condition information and a management command to the gateway in a management operation, so that the gateway determines, according to the target device condition information, one or more target devices meeting the condition and sends the management command to these target devices, thereby managing a type of target devices in batches. Compared with the prior art, the solution provided by the embodiment of the present disclosure is easy to implement, involves few operations, and may manage multiple specific devices by changing the target device condition information.

In the server provided by the embodiment of the present disclosure, the specific work mode of the management information sending module 1302 may be: configuring a management information node in the management tree of the gateway, and storing the management information into the management information node in the form of node values. The specific work mode of the management information sending module 1302 may also be: sending the management information through a management command carrying second storage location information and second execution identifier information, where the second storage location information is used to describe the location for storing the determined target device information, and the second execution identifier information is used to instruct the gateway to send the management command to the target device recorded in the second storage location information.

In addition, the server provided by the embodiment of the present disclosure may configure a management subtree in the management tree of the gateway, and store the management related information into the subnode in the management subtree to perform a batch management operation. Accordingly, the condition information configuring module 1301 is specifically adapted to configure a target device group subtree in the management tree of the gateway and store the target device condition information into the target device group subtree. The management information sending module 1302 is specifically adapted to configure a device group management subtree in the management tree of the gateway, and store the management information into the device group management subtree. The triggering module 1303 is specifically adapted to configure a second target device group identifier in the device group management subtree of the gateway, where the value of the second target device group identifier is consistent with the value of the first target device group identifier configured in the target device group subtree to which the management information needs to be sent; and instruct the gateway to send the management information to all target devices stored in the target device group subtree where the first target device group identifier consistent with the second target device group identifier is located.

Figure 14:
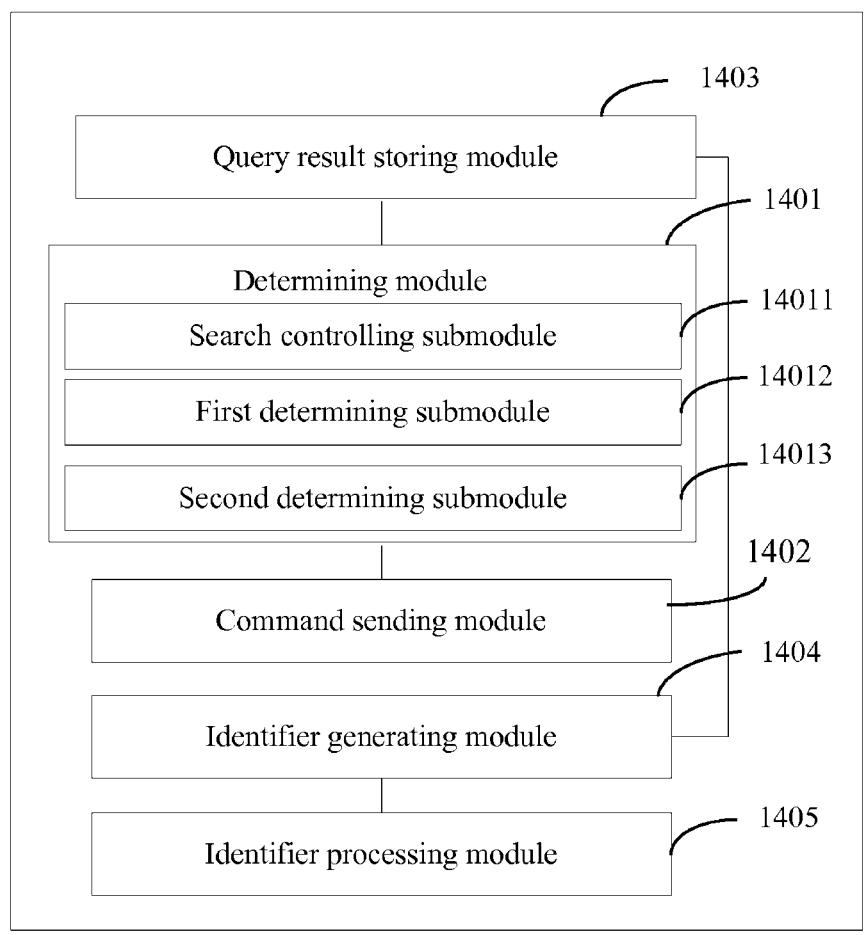
FIG. 14 is a schematic structural diagram of a gateway according to an embodiment of the present disclosure.

An embodiment of the present disclosure also provides a gateway in a DM system. The structure of the gateway is shown in FIG. 14, and the specific structure includes: a determining module 1401 and a command sending module 1402.

The determining module 1401 is adapted to determine a target device according to a trigger of a server and target device condition information sent by the server.

The command sending module 1402 is adapted to send management information to the target device according to a trigger of the server, where the management information is sent by the server.

The determining module 1401 includes a search controlling submodule 14011, a first determining submodule 14012, and a second determining submodule 14013.

The search controlling submodule 14011 is adapted to trigger, according to the indication of the server, the first determining submodule 14012 to work or trigger the second determining submodule 14013 to work.

The first determining submodule 14012 is adapted to determine the target device by searching locally according to the target device condition information sent by the server.

The second determining submodule 14013 is adapted to determine the target device according to the information reported by the device in the local area network.

The second determining submodule 14013 is specifically adapted to send, through a Sessionless command, the target device condition information sent by the server to all devices in the local area network, so that each device matches the target device condition information to determine whether the device itself is a target device; and determine target devices according to the results returned by the successfully matched devices in the local area network.

If the management information sent by the server is in the form of a management command carrying first storage location information and first execution identifier information, or carrying second storage location information and second execution identifier information, the command sending module 1402 is specifically adapted to delete the first storage location information and first execution identifier information carried in the management command, or delete the second storage location information and second execution identifier information carried in the management command; and send the management command with the first storage location information and first execution identifier information deleted to the target device or send the management command with the second storage location information and second execution identifier information deleted to the target device.

The gateway provided by the embodiment of the present disclosure further includes a query result storing module 1403, adapted to configure a query result node in the management tree, and store the determined target device information into the query result node in the form of node values.

In addition, if the server configures a corresponding management subtree on the gateway, the gateway provided by the embodiment of the present disclosure further includes an identifier generating module 1404 and an identifier processing module 1405. The identifier generating module 1404 is adapted to generate a first target device group identifier after the determining module 1401 determines the target device, and the identifier processing module 1405 is adapted to store the first target device group identifier into the target device group subtree, and feed back the first target device group identifier to the server, where the first target device group identifier is used to identify the corresponding target device group subtree.

The above descriptions are merely exemplary embodiments of the present disclosure, but the protection scope of the present disclosure is not limited thereto. Any modification or replacement that can be easily thought of by persons skilled in the art without departing from the technical scope of the present disclosure shall fall within the protection scope of the present disclosure. Therefore, the protection scope of the present disclosure is subject to the appended claims.

What is claimed is:

1. A method for managing devices in a device management system, comprising:
   sending, by a server, target device condition information and management information for a target device to a gateway; and
   triggering, by the server, the gateway to determine the target device according to the target device condition information and to send the management information to the target device.

2. The method according to claim 1, wherein the sending the target device condition information to the gateway comprises:
   configuring, by the server, the target device condition information in a management tree of the gateway.

3. The method according to claim 2, wherein the sending the management information for the target device to the gateway comprises:
   configuring, by the server, a management information node in the management tree of the gateway, and storing the management information into the management information node in the form of node values.

4. The method according to claim 3, further comprising:
   configuring, by the server, an indication node in the management tree of the gateway, and indicating, through a node value of the indication node, a manner to determine the target device to the gateway.

5. The method according to claim 1, wherein the target device condition information comprises a path of nodes to be matched, or the target device condition information comprises the path of the nodes to be matched and node values of the nodes to be matched.

6. The method according to claim 4, wherein the management information is sent through a management command carrying first storage location information and first execution identifier information, wherein the first storage location information is used to describe a location for storing the target device condition information in the gateway, and the first execution identifier information is used to instruct the gateway to determine the target device according to the target device condition information and send the management information to the target device.

7. The method according to claim 1, wherein when the server sends management information again, the management information sent again carries third storage location information and third execution identifier information, wherein the third storage location information is used to describe a location for storing target device information determined in a historical management operation, and the third execution identifier information is used to instruct the gateway to send the management information to the target device recorded in the third storage location information.

8. A method for managing devices in a device management system, comprising:
   sending, by a server, target device condition information to a gateway;
   triggering, by the server, the gateway to determine a target device according to the target device condition information; and
   sending, by the server, management information for the target device to the gateway, which triggers the gateway to send the management information to the target device.

9. The method according to claim 8, wherein the sending the target device condition information to the gateway comprises:
   configuring, by the server, the target device condition information in a management tree of the gateway.

10. The method according to claim 8, wherein the target device condition information comprises a path of nodes to be matched, or comprises the path of the nodes to be matched and node values of the nodes to be matched.

11. The method according to claim 8, further comprising:
    configuring, by the server, an indication node in the management tree of the gateway, and indicating, through a node value of the indication node, a manner to determine the target device to the gateway.

12. The method according to claim 8, wherein the management information is sent through a management command carrying second storage location information and second execution identifier information, wherein the second storage location information is used to describe a location for storing determined target device information, and the second execution identifier information is used to instruct the gateway to send the management command to the target device recorded in the second storage location information.

13. The method according to claim 8, wherein the sending the target device condition information to the gateway comprises:
    creating, by the server, a target device group subtree in a management tree of the gateway, and storing the target device condition information into the target device group subtree.

14. The method according to claim 8 wherein the sending the management information for the target device to the gateway comprises:
    creating, by the server, a device group management subtree in the management tree of the gateway; and
    storing, by the server, the management information into the device group management subtree.

15. The method according to claim 14, wherein the triggering the gateway to send the management information to the target device comprises:
    configuring, by the server, a second target device group identifier in the device group management subtree of the gateway, wherein the second target device group identifier points to the target device group subtree corresponding to the management information of the current management; and
    instructing, by the server, the gateway to send the management information to all target devices stored in the target device group subtree that the second target device group identifier points to.

16. The method according to claim 15, further comprising:
    configuring, by the server, a result node in the device group management subtree, wherein the result node is used to store target device information and a feedback result after the target device receives the management information.

17. The method according to claim 8 wherein when the server sends management information again, the management information sent again carries third storage location information and third execution identifier information, wherein the third storage location information is used to describe a location for storing target device information determined in a historical management operation, and the third execution identifier information is used to instruct the gateway to send the management information to the target device recorded in the third storage location information.

18. A method for managing devices in a device management system, comprising:
    determining, by a gateway, a target device according to a trigger of a server and target device condition information sent by the server; and
    sending, by the gateway, management information to the target device according to a trigger of the server, wherein the management information is sent to the gateway by the server.

19. The method according to claim 18, wherein the determining, by a gateway, a target device according to a trigger of a server and target device condition information sent by the server comprises:
    according to the trigger of the server and an indication about a way of searching for the target device and according to the target device condition information sent by the server, determining, by the gateway, the target device by searching a management tree; or, sending the target device condition information to devices in a local area network and determining the target device according to information reported by the devices in the local area network.

20. The method according to claim 19, further comprising:
    configuring, by the gateway, a query result node in the management tree, and storing determined target device information into the query result node in the form of node values.

21. The method according to claim 19, wherein the sending the target device condition information to devices in a local area network and determining the target device according to information reported by the devices in the local area network comprise:
    sending, by the gateway through a sessionless command, the target device condition information sent by the server, to all devices in the local area network;
    determining, by each device in the local area network, whether the device is the target device by matching the target device condition information, and returning a matching result to the gateway; and
    determining, by the gateway, the target device according to the matching result returned by a successfully matched device in the local area network.

22. The method according to claim 18, wherein if the management information sent by the server is in the form of a management command carrying storage location information and execution identifier information, the sending the management command sent by the server to the target device comprises:

deleting, by the gateway, the storage location information and execution identifier information carried in the management command; and sending, by the gateway, the management command with the storage location information and execution identifier information deleted to the target device.

23. The method according to claim 19, further comprising:
storing, by the gateway, device information of the determined target device into a target device group subtree.

24. The method according to claim 23, further comprising:
after finishing determining the target device, generating, by the gateway, a first target device group identifier, wherein the first target device group identifier is used to identify the target device group subtree; and storing, by the gateway, the first target device group identifier into the target device group subtree, and feeding back the first target device identifier to the server.

25. The method according to claim 24, wherein the sending the management information sent by the server to the target device comprises:

according to a second device group identifier sent by the server, searching, by the gateway, a target device recorded in the target device group subtree that the second target device group identifier points to, and sending the management information.

26. A server in a device management system, comprising:
a condition information configuring module, adapted to send target device condition information to a gateway;
a management information sending module, adapted to send management information for a target device to the gateway; and
a triggering module, adapted to trigger the gateway to determine the target device according to the target device condition information and send the management information to the target device.

27. The server according to claim 26, wherein the condition information configuring module is adapted to configure the target device condition information in a management tree of the gateway.

28. The server according to claim 27, wherein the management information sending module is adapted to configure a management information node in the management tree of the gateway, and to store the management information into the management information node in the form of node values.

29. The server according to claim 27, further comprising an indicating module, adapted to:
configure an indication node in the management tree of the gateway; and
indicate, through a node value of the indication node, a way of determining the target device to the gateway.

30. The server according to claim 26, wherein the management information sending module is specifically adapted to send the management information through a management command carrying first storage location information and first execution identifier information, wherein the first storage location information is used to describe a location for storing the target device condition information in the gateway, and the first execution identifier information is used to instruct the gateway to determine the target device according to the target device condition information and send the management information to the target device.

31. A server in a device management system, comprising:
a condition information configuring module, adapted to send target device condition information to a gateway;
a triggering module, adapted to trigger the gateway to determine a target device according to the target device condition information; and
a management information sending module, adapted to send management information for the target device to the gateway,
wherein the triggering module is further adapted to trigger the gateway to send the management information to the target device after the management information sending module completes work.

32. The server according to claim 31, wherein the management information sending module is adapted to send the management information through a management command carrying second storage location information and second execution identifier information, wherein the second storage location information is used to describe a location for storing determined target device information, and the second execution identifier information is used to instruct the gateway to send the management command to the target device recorded in the second storage location information.

33. The server according to claim 31, wherein the condition information configuring module is adapted to create a target device group subtree in a management tree of the gateway and store the target device condition information into the target device group subtree.

34. The server according to claim 31, wherein the management information sending module is adapted to create a device group management subtree in the management tree of the gateway and store the management information into the device group management subtree.

35. The server according to claim 34, wherein the triggering module is adapted to configure a second target device group identifier in the device group management subtree of the gateway, wherein the second target device group identifier points to the target device group subtree corresponding to the management information of the current management; and instruct the gateway to send the management information to all target devices in the target device group subtree that the second target device group identifier points to.

36. A gateway device in a device management system, comprising:
a determining module, adapted to determine a target device according to a trigger of a server and target device condition information sent by the server; and
a command sending module, adapted to send management information to the target device according to a trigger of the server, wherein the management information is sent by the server.

37. The gateway device according to claim 36, wherein the determining module comprises a search controlling submodule, a first determining submodule, and a second determining submodule, wherein:
the search controlling submodule is adapted to trigger, according to the trigger of the server and an indication about a manner to determine the target device, the first determining submodule to work or the second determining submodule to work;
the first determining submodule is adapted to determine the target device by searching a management tree according to the target device condition information sent by the server; and
the second determining submodule is adapted to send the target device condition information to devices in a local area network and determine the target device according to information fed back by the devices in the local area network.

38. The gateway device according to claim 37, further comprising a query result storing module, adapted to configure a query result node in the management tree, and to store determined target device information into the query result node in the form of node values.

39. The gateway device according to claim 37, wherein: the second determining submodule is specifically adapted to send, through a sessionless command, the target device condition information sent by the server to all devices in the local area network; each device in the local area network determines whether the device itself is the target device by matching the target device condition information and returns a matching result to the gateway; and the second determining submodule determines the target device according to the result returned by a successfully matched device in the local area network.

40. The gateway device according to claim 36, wherein if the management information sent by the server is in the form of a management command carrying storage location information and execution identifier information, the command sending module is specifically adapted to delete the storage location information and execution identifier information carried in the management command; and send the management command with the storage location information and execution identifier information deleted to the target device.

41. The gateway device according to claim 37, further comprising an identifier generating module and an identifier processing module, wherein the identifier generating module is adapted to generate a first target device group identifier after the determining module determines the target device, and the identifier processing module is adapted to store the first target device group identifier into a target device group subtree, and feed back the first target device group identifier to the server, wherein the first target device group identifier is used to identify the target device group subtree.

42. The gateway device according to claim 41, wherein the management information sending module of the gateway is specifically adapted to search, according to an indication of a second device group identifier sent by the server, a target device recorded in the target device group subtree that the second target device group identifier points to, and send the management information.

* * * * *

UNITED STATES PATENT AND TRADEMARK OFFICE
CERTIFICATE OF CORRECTION

| | | |
|---|---|---|
| PATENT NO. | : 8,713,155 B2 | Page 1 of 1 |
| APPLICATION NO. | : 13/660509 | |
| DATED | : April 29, 2014 | |
| INVENTOR(S) | : Jin et al. | |

It is certified that error appears in the above-identified patent and that said Letters Patent is hereby corrected as shown below:

*Title page, Applicant's City of Residence "Guangdong (CN)" should read --Shenzhen (CN)--.*

Signed and Sealed this
Ninth Day of September, 2014

Michelle K. Lee
*Deputy Director of the United States Patent and Trademark Office*